United States Patent
Mizukami et al.

(10) Patent No.: US 9,879,691 B2
(45) Date of Patent: Jan. 30, 2018

(54) DYNAMIC PRESSURE BEARING PUMP

(71) Applicant: Nidec Corporation, Kyoto (JP)

(72) Inventors: Junya Mizukami, Kyoto (JP); Hideki Nishimura, Kyoto (JP); Yoshito Nishitani, Kyoto (JP); Michihiro Ito, Kyoto (JP); Naohiro Nagasawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 320 days.

(21) Appl. No.: 14/820,678

(22) Filed: Aug. 7, 2015

(65) Prior Publication Data
US 2016/0053770 A1    Feb. 25, 2016

(30) Foreign Application Priority Data

Aug. 22, 2014 (JP) .................. 2014-169792
Jun. 23, 2015 (JP) .................. 2015-125605

(51) Int. Cl.
| | | |
|---|---|---|
| F04D 29/18 | (2006.01) | |
| F04D 3/00 | (2006.01) | |
| F04D 5/00 | (2006.01) | |
| F04D 11/00 | (2006.01) | |
| F04D 13/06 | (2006.01) | |
| F04D 29/047 | (2006.01) | |

(52) U.S. Cl.
CPC ............. F04D 29/186 (2013.01); F04D 3/00 (2013.01); F04D 5/001 (2013.01); F04D 11/00 (2013.01);
(Continued)

(58) Field of Classification Search
CPC .......... F04D 29/186; F04D 3/00; F04D 5/001; F04D 11/00; F04D 13/0633; F04D 29/0476; F04D 25/06
(Continued)

(56) References Cited

U.S. PATENT DOCUMENTS

| | | | | |
|---|---|---|---|---|
| 2,113,213 A | * | 4/1938 | Leonard ............... | F04D 13/043 417/247 |
| 2,500,400 A | * | 3/1950 | Cogswell ............... | F04D 3/02 310/67 R |
| 2,706,451 A | * | 4/1955 | Carlos ................. | F04D 3/00 223/37 |

(Continued)

FOREIGN PATENT DOCUMENTS

| | | |
|---|---|---|
| JP | 10-184302 A | 7/1998 |
| JP | 11-294879 A | 10/1999 |

(Continued)

OTHER PUBLICATIONS

Mizukami, J. et al.; "Dynamic Pressure Bearing Pump"; U.S. Appl. No. 14/820,675, filed Aug. 7, 2015.

Primary Examiner — Devon Kramer
Assistant Examiner — Benjamin Doyle
(74) Attorney, Agent, or Firm — Keating & Bennett, LLP

(57) ABSTRACT

A pump a shaft portion arranged to extend in a vertical direction; a rotor portion arranged to surround an outer circumference of the shaft portion, and including a magnet; and a housing joined to the shaft portion, and arranged to contain the rotor portion. The housing includes a stator arranged opposite to the magnet; a rotor accommodating portion arranged to accommodate the rotor portion; and an inlet and an outlet each of which is arranged to pass through a portion of the rotor accommodating portion. A surface of at least one of the rotor portion, the shaft portion, and the rotor accommodating portion includes at least one first dynamic pressure groove arranged to support rotation of the rotor portion. A surface of at least one of the rotor portion and the rotor accommodating portion includes at least one second dynamic pressure groove arranged to transfer a fluid from the inlet to the outlet.

19 Claims, 15 Drawing Sheets

(52) U.S. Cl.
CPC ..... *F04D 13/0633* (2013.01); *F04D 29/0476* (2013.01)

(58) Field of Classification Search
USPC ......... 417/355; 415/104, 106–107, 110–112, 415/229
See application file for complete search history.

(56) References Cited

U.S. PATENT DOCUMENTS

| | | | | |
|---|---|---|---|---|
| 3,674,355 A * | 7/1972 | Yearout et al. | ........... | F16C 7/02 384/110 |
| 3,790,309 A * | 2/1974 | Volz | ........... | F04C 2/165 417/368 |
| 4,470,752 A * | 9/1984 | Teruo | ........... | F02M 37/04 415/143 |
| 4,710,034 A * | 12/1987 | Tittizer | ........... | F01D 25/22 384/110 |
| 4,883,367 A * | 11/1989 | Maruyama | ........... | F16C 17/026 384/107 |
| 4,925,321 A * | 5/1990 | Maruyama | ........... | A47L 9/22 384/100 |
| 5,018,880 A * | 5/1991 | Nakasugi | ........... | F16C 17/107 384/107 |
| 5,088,899 A * | 2/1992 | Blecker | ........... | F04D 3/02 417/356 |
| 5,120,139 A * | 6/1992 | Asada | ........... | F16C 17/02 384/107 |
| 5,209,650 A * | 5/1993 | Lemieux | ........... | F01D 15/10 384/115 |
| 5,246,294 A * | 9/1993 | Pan | ........... | F16C 17/105 384/110 |
| 5,332,377 A * | 7/1994 | Hirayama | ........... | F04C 18/107 417/355 |
| 5,487,608 A * | 1/1996 | Leuthold | ........... | F16C 17/107 384/113 |
| 5,675,200 A * | 10/1997 | Hayashi | ........... | F16C 17/026 310/90 |
| 5,795,073 A * | 8/1998 | Arvidsson | ........... | F16C 32/0696 384/107 |
| 5,827,042 A * | 10/1998 | Ramsay | ........... | F04D 3/02 415/112 |
| 5,924,975 A * | 7/1999 | Goldowsky | ........... | F04B 17/046 600/16 |
| 5,926,342 A * | 7/1999 | Nose | ........... | G11B 19/2009 360/98.07 |
| 6,034,453 A * | 3/2000 | Eom | ........... | H02K 7/085 310/68 R |
| 6,068,454 A * | 5/2000 | Gaston | ........... | F04D 3/02 416/241 A |
| 6,108,909 A * | 8/2000 | Cheever | ........... | B21H 7/187 29/898.02 |
| 6,210,103 B1 * | 4/2001 | Ramsay | ........... | F16C 25/02 277/318 |
| 6,436,027 B1 * | 8/2002 | Goldowsky | ........... | A61M 1/1055 600/16 |
| 6,439,774 B1 * | 8/2002 | Knepper | ........... | F16C 17/105 29/413 |
| 6,499,966 B1 * | 12/2002 | Werson | ........... | B62D 5/064 417/355 |
| 6,527,699 B1 * | 3/2003 | Goldowsky | ........... | A61M 1/12 600/16 |
| 6,595,743 B1 * | 7/2003 | Kazatchkov | ........... | F04D 3/00 415/170.1 |
| 6,664,683 B1 * | 12/2003 | Yashiro | ........... | F04D 19/04 310/67 R |
| 6,679,685 B2 * | 1/2004 | Maruyama | ........... | F04D 15/0033 222/333 |
| 6,695,480 B1 * | 2/2004 | Ramsay | ........... | F04D 29/047 384/110 |
| 6,808,371 B2 * | 10/2004 | Niwatsukino | ........... | F04D 5/002 361/699 |
| 6,933,642 B2 * | 8/2005 | Kusaka | ........... | F16C 17/026 310/90.5 |
| 7,011,450 B2 * | 3/2006 | Kusaka | ........... | F16C 17/107 384/107 |
| 7,213,972 B2 * | 5/2007 | Grantz | ........... | F16C 17/105 384/110 |
| 7,229,258 B2 * | 6/2007 | Wood | ........... | F16C 32/044 417/355 |
| 7,381,034 B2 * | 6/2008 | Shishido | ........... | F04D 3/00 417/423.12 |
| 7,568,896 B2 * | 8/2009 | Dooley | ........... | F04D 3/02 415/110 |
| 7,832,989 B2 * | 11/2010 | Chang | ........... | H01M 8/04201 417/15 |
| 8,167,589 B2 * | 5/2012 | Hidaka | ........... | A61M 1/101 417/356 |
| 8,376,926 B2 * | 2/2013 | Benkowsi | ........... | A61M 1/101 417/355 |
| 8,558,424 B2 * | 10/2013 | Auten | ........... | F03B 13/10 310/90.5 |
| 8,777,832 B1 * | 7/2014 | Wang | ........... | A61M 1/1024 600/16 |
| 8,894,387 B2 * | 11/2014 | White | ........... | F04D 29/0413 415/104 |
| 9,227,001 B2 * | 1/2016 | Akkerman | ........... | A61M 1/1017 |
| 9,638,202 B2 * | 5/2017 | Ozaki | ........... | A61M 1/101 |
| 2001/0051097 A1 * | 12/2001 | Takura | ........... | F04D 3/02 417/355 |
| 2002/0006183 A1 * | 1/2002 | Ide | ........... | H01J 35/101 378/133 |
| 2003/0072656 A1 * | 4/2003 | Niwatsukino | ........... | F04D 5/002 417/354 |
| 2004/0241019 A1 * | 12/2004 | Goldowsky | ........... | A61M 1/1015 417/423.1 |
| 2005/0152782 A1 * | 7/2005 | Shishido | ........... | F04D 3/00 415/220 |
| 2006/0245959 A1 * | 11/2006 | LaRose | ........... | F04D 3/02 417/423.5 |
| 2008/0038122 A1 * | 2/2008 | Kikuchi | ........... | F04D 3/00 417/356 |
| 2008/0262289 A1 * | 10/2008 | Goldowsky | ........... | A61M 1/1015 600/16 |
| 2008/0269880 A1 * | 10/2008 | Jarvik | ........... | F04D 3/00 623/3.13 |
| 2009/0196540 A1 * | 8/2009 | Maruyama | ........... | F16C 17/10 384/100 |
| 2009/0306771 A1 * | 12/2009 | Hidaka | ........... | A61M 1/101 623/3.14 |
| 2010/0296190 A1 * | 11/2010 | Yamada | ........... | F16C 17/107 360/99.08 |
| 2011/0097025 A1 * | 4/2011 | Satoji | ........... | F16C 17/107 384/100 |
| 2011/0172048 A1 * | 7/2011 | Nishida | ........... | F16C 17/102 475/159 |
| 2012/0089225 A1 * | 4/2012 | Akkerman | ........... | A61M 1/1017 623/3.13 |
| 2013/0121859 A1 * | 5/2013 | Hirono | ........... | F04D 25/062 417/423.13 |
| 2014/0009020 A1 * | 1/2014 | Kwon, II | ........... | F16C 32/0696 310/90 |
| 2016/0053769 A1 * | 2/2016 | Mizukami | ........... | F04D 3/00 417/423.14 |
| 2016/0053770 A1 * | 2/2016 | Mizukami | ........... | F04D 3/00 417/423.14 |

FOREIGN PATENT DOCUMENTS

| | | |
|---|---|---|
| JP | 2004-245303 A | 9/2004 |
| JP | 2004-278375 A | 10/2004 |
| JP | 2004-305828 A | 11/2004 |
| JP | 2005-201054 A | 7/2005 |
| JP | 2007-000350 A | 1/2007 |
| JP | 2007-218154 A | 8/2007 |

* cited by examiner

DYNAMIC PRESSURE BEARING PUMP

BACKGROUND OF THE INVENTION

1. Field of the Invention

The present invention relates to a pump arranged to transfer a fluid through a pressure generated by a dynamic pressure groove.

2. Description of the Related Art

In recent years, electronic components containing CPUs or the like have been reduced in size, and an increase in the amount of arithmetic processing has increased the amount of heat generated by the electronic components. One method of cooling such an electronic component is to load a refrigerant liquid in a heat pipe, and cause the refrigerant liquid to circulate in the heat pipe to cool the electronic component. For efficient cooling of the electronic component, use of a pump to cause circulation of the refrigerant liquid is effective. Miniaturization of the electronic components demands miniaturization of pumps.

A known small-sized pump is described in, for example, JP-A 2007-218154. The known small-sized pump described in JP-A 2007-218154 is a vortex pump including: an impeller including a disc-shaped blade portion including a plurality of blades at an outer circumference thereof, and a tubular bearing portion including a bearing at an inner circumference thereof; a shaft arranged to support the impeller such that the impeller is movable in a thrust direction; a drive apparatus arranged around the bearing portion of the impeller to rotate the impeller; and a case member arranged to contain the impeller, the shaft, and the drive apparatus. The case member includes a fluid transfer portion arranged to accommodate the blade portion, and a drive apparatus accommodating portion arranged to accommodate the drive apparatus. Dynamic pressure grooves arranged to generate dynamic pressures in accordance with rotation of the impeller are defined in both faces of the impeller or in surfaces of the case member which are opposed to the respective faces of the impeller. The dynamic pressure grooves are defined at positions inside of the blades.

The impeller of the known pump includes the blade portion including the plurality of blades, which are arranged to transfer a fluid, and the tubular bearing portion including the bearing at the inner circumference thereof. The known pump needs to include a space to accommodate the blade portion, which makes it difficult to further reduce the size of the electronic component.

SUMMARY OF THE INVENTION

A dynamic pressure bearing pump according to a preferred embodiment of the present invention includes a shaft portion arranged to extend in a vertical direction; a rotor portion arranged to surround an outer circumference of the shaft portion, and including a magnet; and a housing joined to the shaft portion, and arranged to contain the rotor portion. The housing includes a stator arranged opposite to the magnet; a rotor accommodating portion arranged to accommodate the rotor portion; and an inlet and an outlet each of which is arranged to pass through a portion of the rotor accommodating portion. A surface of at least one of the rotor portion, the shaft portion, and the rotor accommodating portion includes at least one first dynamic pressure groove arranged to support rotation of the rotor portion. A surface of at least one of the rotor portion and the rotor accommodating portion includes at least one second dynamic pressure groove arranged to transfer a fluid from the inlet to the outlet.

According to the above preferred embodiment of the present invention, the at least one first dynamic pressure groove, which is arranged to rotatably support the rotor portion, and the at least one second dynamic pressure groove arranged to transfer the fluid are arranged in or near the rotor portion, and this eliminates a need to provide a space to accommodate a blade portion, making it possible to reduce the size of the pump.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is assumed herein that a direction parallel to a rotation axis of a rotor is referred to by the term "axial direction", "axial", or "axially", that directions perpendicular to the rotation axis of the rotor are referred to by the term "radial direction", "radial", or "radially", and that a direction along a circular arc centered on the rotation axis of the rotor is referred to by the term "circumferential direction", "circumferential", or "circumferentially". Note, however, that the term "parallel" as used above includes "substantially parallel". Also note that the term "perpendicular" as used above includes "substantially perpendicular".

Figure 1:
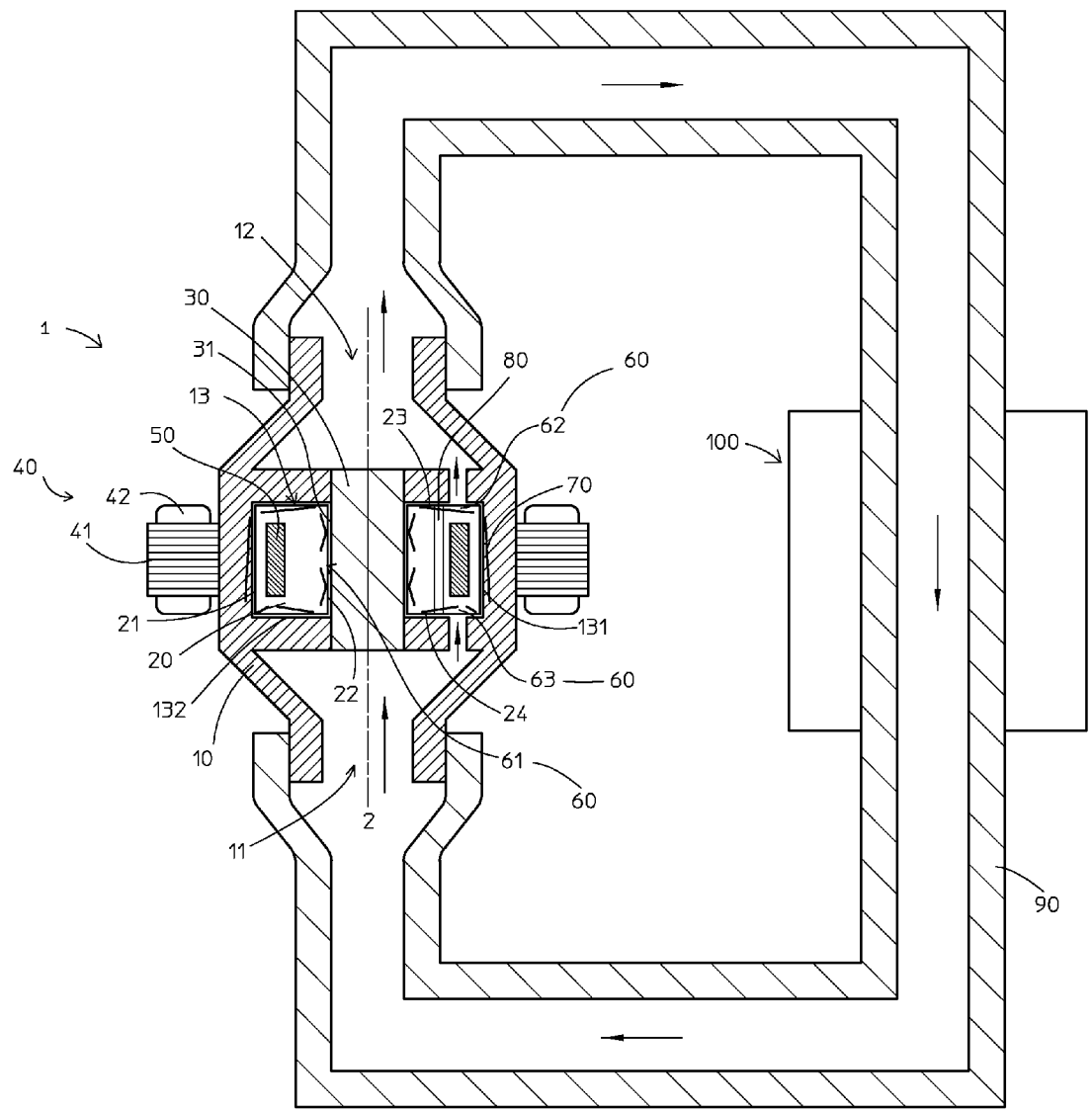
FIG. 1 is a vertical cross-sectional view of a pump according to a first preferred embodiment of the present invention.

FIG. 1 is a vertical cross-sectional view of a pump 1 according to a first preferred embodiment of the present invention. The pump 1 is, for example, joined to a heat pipe containing a refrigerant liquid, is installed in an electronic device which generates heat at a CPU or the like, and is used to circulate the refrigerant liquid within the heat pipe to cool the electronic device. Note, however, that pumps according to other preferred embodiments of the present invention may be used to transfer fluids for purposes other than cooling, and that fluids other than refrigerant liquids may be used in other preferred embodiments of the present invention. Also note that pumps according to preferred embodiments of the present invention may be used for household electrical appliances, transportation equipment, such as automobiles, medical appliances, or other applications.

Referring to FIG. 1, the pump 1 according to the present preferred embodiment includes a housing 10, a rotor portion 20, and a shaft portion 30.

The housing 10 is a case connected to a pipe which is used to transfer a fluid. The housing 10 includes connections to connect the housing 10 to the pipe. The pipe is connected to an inlet 11 through which the fluid flows into the pump 1, and an outlet 12 through which the fluid is discharged out of the pump 1. The housing 10 includes a stator 40 arranged opposite to a magnet 50, a rotor accommodating portion 13 arranged to accommodate the rotor portion 20, and the inlet 11 and the outlet 12, each of which is arranged to pass through a portion of the rotor accommodating portion 13. The rotor portion 20 is arranged inside the rotor accommodating portion 13 of the housing 10. The rotor portion 20 is arranged to surround an outer circumference of the shaft portion 30, and includes the magnet 50. The stator 40 and the magnet 50 are arranged opposite to each other, and supply of electricity to the stator 40 causes the rotor portion 20 to rotate. A material of the housing 10 may be, for example, a metal, such as stainless steel, or a resin, such as a liquid crystal polymer (LCP).

The shaft portion 30 is arranged inside of the housing 10. The shaft portion 30 is arranged to pass through the rotor accommodating portion 13. Preferably, both ends of the shaft portion 30 are joined to the housing 10. Note that, alternatively, only one end of the shaft portion 30 may be joined to the housing 10. A material of the shaft portion 30 is, for example, a metal, such as stainless steel. A surface of the shaft portion 30 is subjected to a process such as, for example, grinding to be reduced in the degree of surface roughness and cylindricity.

The stator 40 includes a stator core 41 and a plurality of coils 42. The stator core 41 is defined by, for example, laminated steel sheets. The stator core 41 is fixed to the housing 10 through, for example, an adhesive. The stator core 41 includes a core back and a plurality of teeth arranged to extend radially inward from the core back in a radial manner. Each coil 42 is defined by a conducting wire wound around a separate one of the teeth. The coils 42 are arranged at substantially regular intervals in a circumferential direction around a rotation axis 2.

The inlet 11 is arranged to open into a space inside the rotor accommodating portion 13. In addition, the outlet 12 is arranged to open into the space inside the rotor accommodating portion 13. That is, the pump 1 includes an internal channel leading from the inlet 11 to the outlet 12 through the space inside the rotor accommodating portion 13.

The rotor portion 20 is arranged to have the shaft portion 30 as a central axis thereof, is substantially cylindrical, and is arranged to have the shaft portion 30 inserted therethrough in an axial direction. Further, the rotor portion 20 is arranged inside the rotor accommodating portion 13. That is, the rotor portion 20 is arranged to surround a shaft outer circumferential surface 31 of the shaft portion 30 inside the rotor accommodating portion 13. The magnet 50 is arranged in the vicinity of a rotor outer circumferential surface 21 of the rotor portion 20. The magnet 50 is arranged radially opposite to the stator 40. That is, the shaft portion 30, the magnet 50, and the stator 40 are arranged to radially overlap with one another. A material of the rotor portion 20 may be, for example, a metal, such as stainless steel, or a resin, such as an LCP.

The rotor portion 20 according to the present preferred embodiment is arranged to have the shaft portion 30 as the central axis thereof, is substantially cylindrical, and is arranged to have the shaft portion 30 inserted therethrough in the axial direction. The rotor portion 20 includes the rotor outer circumferential surface 21, a rotor inner circumferential surface 22, a rotor upper surface 23, and a rotor lower surface 24. Each of the rotor outer circumferential surface 21 and the rotor inner circumferential surface 22 is a cylindrical surface having the rotation axis 2 as a central axis thereof and parallel or substantially parallel to the central axis. Further, each of the rotor upper surface 22 and the rotor lower surface is an annular surface perpendicular or substantially perpendicular to the shaft portion 30. The rotor outer circumferential surface 21 is arranged opposite to a housing inner circumferential surface 131, which is an inside surface of the rotor accommodating portion 13, with a gap intervening therebetween. The rotor inner circumferential surface 22 is arranged opposite to the shaft outer circumferential surface 31 with a gap intervening therebetween. Further, each of the rotor upper surface 23 and the rotor lower surface 24 is arranged opposite to an inner surface 132 of the rotor accommodating portion 13 with a gap intervening therebetween.

Each of the inlet 11 and the outlet 12 is arranged to have an opening in the inner surface 132. Note that each of the inlet 11 and the outlet 12 may alternatively be arranged to have an opening at another position, and that one of the inlet 11 and the outlet 12 may alternatively be arranged to have an opening in the housing inner circumferential surface 131.

A surface of at least one of the rotor portion 20, the shaft portion 30, and the rotor accommodating portion 13 includes first dynamic pressure grooves 60 arranged to support rotation of the rotor portion 20. More specifically, at least one of the rotor inner circumferential surface 22 and the shaft outer circumferential surface 31 includes radial dynamic pressure grooves 61, which belong to the first dynamic pressure grooves 60. In addition, at least one of the inner surface of the rotor accommodating portion, the rotor upper surface, and the rotor lower surface includes thrust dynamic pressure grooves, which belong to the first dynamic pressure grooves 60. More specifically, at least one of the rotor upper surface 23 and a portion of the inner surface 132 which is opposed to the rotor upper surface 23 with a gap intervening therebetween includes upper thrust dynamic pressure grooves 62, which belong to the first dynamic pressure grooves 60.

Further, at least one of the rotor lower surface 24 and a portion of the inner surface 132 which is opposed to the rotor lower surface 24 with a gap intervening therebetween includes lower thrust dynamic pressure grooves 63, which belong to the first dynamic pressure grooves 60.

According to the present preferred embodiment, the radial dynamic pressure grooves 61 are defined in the rotor inner circumferential surface 22. Note that the radial dynamic pressure grooves 61 may not necessarily be defined only in the rotor inner circumferential surface 22, but may be defined in both the rotor inner circumferential surface 22 and the shaft outer circumferential surface 31.

According to the present preferred embodiment, the rotor portion 20 includes both the upper thrust dynamic pressure grooves 62 and the lower thrust dynamic pressure grooves 63. Note that only either the upper thrust dynamic pressure grooves or the lower thrust dynamic pressure grooves 63 may be provided. Also note that the upper thrust dynamic pressure grooves 62 may be defined in both the rotor upper surface 23 and the portion of the inner surface 132 which is opposed to the rotor upper surface 23 with the gap intervening therebetween. Also note that the lower thrust dynamic pressure grooves 63 may be defined in both the rotor lower surface 24 and the portion of the inner surface 132 which is opposed to the rotor lower surface 24 with the gap intervening therebetween.

A surface of at least one of the rotor portion 20 and the rotor accommodating portion 13 includes second dynamic pressure grooves 70 arranged to transfer the fluid from the inlet 11 to the outlet 12. More specifically, at least one of the rotor outer circumferential surface 21 and the housing inner circumferential surface 131 includes the second dynamic pressure grooves 70. Note that the second dynamic pressure grooves 70 may be defined in both the rotor outer circumferential surface 21 and the housing inner circumferential surface 131.

The fluid is arranged in a space including the inlet 11, the outlet 12, and the space inside the rotor accommodating portion 13. Once electric drive currents are supplied to the coils 42 of the stator 40, magnetic flux is generated around each of the teeth of the stator core 41. Then, interaction between the magnetic flux of the stator 40 and that of the magnet 50 produces a circumferential torque, so that the rotor portion 20 is caused to rotate about the central axis, i.e., the rotation axis 2. The rotation of the rotor portion 20 causes pumping action to be produced at the second dynamic pressure grooves 70 to transfer the fluid from the inlet 11 to the outlet 12. In addition, because the space inside the rotor accommodating portion 13 is filled with the fluid, dynamic pressures are generated by the first dynamic pressure grooves 60 between the rotor portion 20 and the shaft portion 30 and between the rotor portion 20 and the rotor accommodating portion 13. The rotation of the rotor portion 20 is supported by these dynamic pressures. The rotor portion 20 is arranged to rotate in a non-contact condition inside the rotor accommodating portion 13 due to the dynamic pressures generated by the first dynamic pressure grooves 60 and the second dynamic pressure grooves 70. Thus, the rotor portion 20 rotates without making contact with the shaft portion 30 or the housing 10, and wear of the rotor portion 20, the shaft portion 30, and the housing 10 does not occur, which contributes to prolonging a life of the pump 1. Moreover, the non-contact condition of the rotor portion 20 enables the fluid to be transferred while preventing degradation or the like of the fluid from occurring. Furthermore, the gap between the shaft outer circumferential surface 31 and the rotor inner circumferential surface 22 is arranged to have a width smaller than the width of the gap between the housing inner circumferential surface 131 and the rotor outer circumferential surface 21. The fact that the width of the gap between the shaft outer circumferential surface 31 and the rotor inner circumferential surface 22 is smaller than the width of the gap between the housing inner circumferential surface 131 and the rotor outer circumferential surface 21 contributes to reducing wobbling of the rotor portion 20 and improving rotational accuracy of the rotor portion 20. An improvement in the rotational accuracy of the rotor portion 20 leads to reduced vibration of the pump 1 and reduced variations in the amount of the fluid being transferred.

According to the present preferred embodiment, the pump 1 includes a pipe portion 90 connected to the inlet 11 and the outlet 12. The pipe portion 90 is a circular pipe. Both ends of the pipe portion 90 are connected to the inlet 11 and the outlet 12, respectively. A portion of the pipe portion 90 is arranged in the vicinity of a heat source 100. An inside of the pump 1 and an inside of the pipe portion 90 together define a closed space in which the fluid circulates. The pump 1 is driven to cause the fluid to flow inside the pipe portion 90 to cool the heat source 100.

Figure 2:
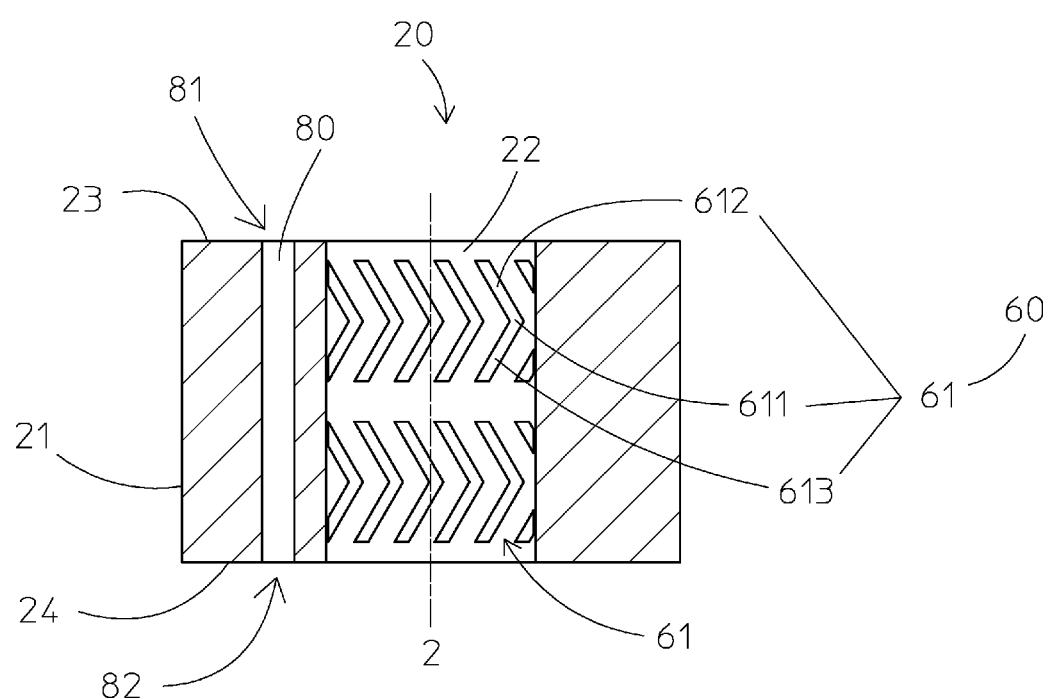
FIG. 2 is a vertical cross-sectional view of a rotor portion according to the first preferred embodiment of the present invention.

FIG. 2 is a vertical cross-sectional view of the rotor portion 20. The rotor portion 20 is arranged to have the shaft portion 30 as the central axis thereof, and is substantially cylindrical. The rotor portion 20 includes the rotor outer circumferential surface 21, the rotor inner circumferential surface 22, the rotor upper surface 23, and the rotor lower surface 24. Each of the rotor outer circumferential surface 21 and the rotor inner circumferential surface 22 is a cylindrical surface having the rotation axis 2 as the central axis thereof and parallel or substantially parallel to the central axis. Further, each of the rotor upper surface 22 and the rotor lower surface 24 is an annular surface perpendicular or substantially perpendicular to the shaft portion 30.

The rotor inner circumferential surface 22 includes the radial dynamic pressure grooves 61, which are the first dynamic pressure grooves 60. The radial dynamic pressure grooves 61 according to the present preferred embodiment are defined by arrays of a plurality of herringbone grooves arranged in the circumferential direction. The rotor inner circumferential surface 22 includes two dynamic pressure groove arrays. The two dynamic pressure groove arrays are arranged in parallel with each other and one above the other in the axial direction. Each of the plurality of herringbone grooves includes a bend portion 611. Each of the plurality of herringbone grooves further includes an outside dynamic pressure groove 612 and an inside dynamic pressure groove 613, each of which is arranged to extend from the bend portion 611. The outside dynamic pressure groove 612 is a dynamic pressure groove arranged to extend from the bend portion 611 toward the rotor upper surface 23 or the rotor lower surface 24. Meanwhile, the inside dynamic pressure groove 613 is a dynamic pressure groove arranged to extend from the bend portion 611 toward an axial middle of the rotor portion 20. The plurality of herringbone grooves are arranged in such a manner that once the rotor portion 20 starts rotating about the central axis, i.e., the rotation axis 2, a portion of the fluid is drawn to the bend portion 611 of each herringbone groove. A dynamic pressure of the portion of the fluid which has been drawn to the bend portion 611 contributes to reducing the wobbling of the rotor portion 20 and improving the rotational accuracy of the rotor portion 20. An improvement in the rotational accuracy of the rotor portion 20 leads to reduced vibration of the pump 1 and reduced variations in the amount of the fluid being transferred.

According to the present preferred embodiment, the outside dynamic pressure groove 612 and the inside dynamic pressure groove 613 are arranged to have the same length. Note that one of the above two dynamic pressure grooves may alternatively be arranged to be longer than the other dynamic pressure groove. More preferably, the outside dynamic pressure groove 612 is arranged to be longer than the inside dynamic pressure groove 613. The greater length of the outside dynamic pressure groove 612 contributes to increasing the dynamic pressures generated at the rotor inner circumferential surface 22, and to improving the rotational accuracy of the rotor portion 20.

Figure 3:
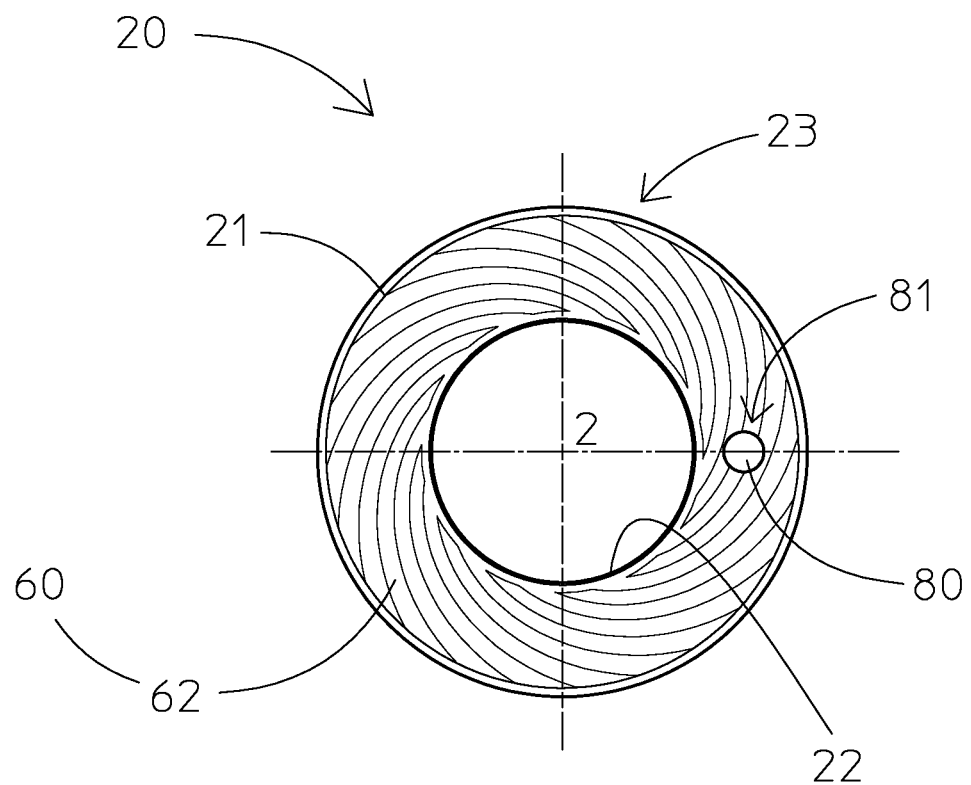
FIG. 3 is a top view of the rotor portion according to the first preferred embodiment of the present invention.
Figure 4:
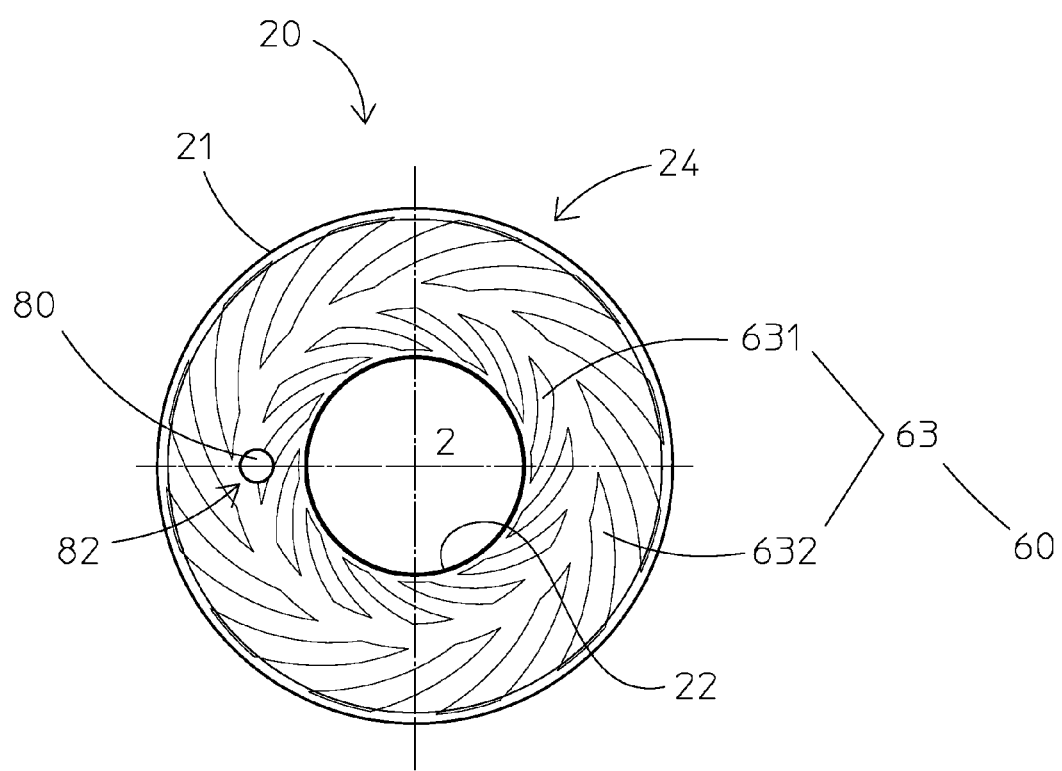
FIG. 4 is a bottom view of the rotor portion according to the first preferred embodiment of the present invention.

FIG. 3 is a top view of the rotor portion 20. FIG. 4 is a bottom view of the rotor portion 20.

In FIG. 3, the rotor upper surface 23 includes the upper thrust dynamic pressure grooves 62, which belong to the first dynamic pressure grooves 60. The upper thrust dynamic pressure grooves 62 are a plurality of spiral grooves arranged in the circumferential direction. The plurality of spiral grooves are defined in the rotor upper surface 23 in such a manner that once the rotor portion 20 starts rotating about the central axis, i.e., the rotation axis 2, the fluid is drawn in a direction away from the rotor outer circumferential surface 21 toward the rotor inner circumferential surface 22. A dynamic pressure of a portion of the fluid which has been drawn toward the rotor inner circumferential surface 22 contributes to reducing the wobbling of the rotor portion 20 and improving the rotational accuracy of the rotor portion 20. An improvement in the rotational accuracy of the rotor portion 20 leads to reduced vibration of the pump 1 and reduced variations in the amount of the fluid being transferred.

In FIG. 4, the rotor lower surface 24 includes the lower thrust dynamic pressure grooves 63, which belong to the first dynamic pressure grooves 60. The lower thrust dynamic pressure grooves 63 are defined by arrays of a plurality of spiral grooves arranged in the circumferential direction, and include two dynamic pressure groove arrays. The two dynamic pressure groove arrays are arranged in mutually different orientations. One of the dynamic pressure groove arrays is made up of inner grooves 631 which are arranged to cause the fluid to be drawn in a direction away from the rotor outer circumferential surface 21 toward the rotor inner circumferential surface 22 once the rotor portion 20 starts rotating about the central axis, i.e., the rotation axis 2. The other dynamic pressure groove array is made up of outer grooves 632 which are arranged to send the fluid in a direction away from the rotor inner circumferential surface 22 toward the rotor outer circumferential surface 21 once the rotor portion 20 starts rotating about the central axis, i.e., the rotation axis 2. A dynamic pressure of a portion of the fluid which has been drawn toward the rotor inner circumferential surface 22 because of each inner groove 631 contributes to reducing the wobbling of the rotor portion 20 and improving the rotational accuracy of the rotor portion 20. An improvement in the rotational accuracy of the rotor portion 20 leads to reduced vibration of the pump 1 and reduced variations in the amount of the fluid being transferred. Meanwhile, a portion of the fluid which has been sent by each outer groove 632 in the direction away from the rotor inner circumferential surface 22 toward the rotor outer circumferential surface 21 is transferred to the rotor outer circumferential surface 21, increasing transfer pressure of the pump 1.

Referring to FIG. 1, according to the present preferred embodiment, the lower thrust dynamic pressure grooves 63 include the two dynamic pressure groove arrays, each of which is made up of dynamic pressure grooves extending in a direction different from a direction in which dynamic pressure grooves of the other dynamic pressure groove array extend. That is, the lower thrust dynamic pressure grooves 63 are arranged to include the dynamic pressure groove arrays arranged in a manner as illustrated in FIG. 4. Further, the upper thrust dynamic pressure grooves 62 are arranged to include a single array of dynamic pressure grooves extending in one direction. That is, the upper thrust dynamic pressure grooves 62 are arranged to include the single dynamic pressure groove array arranged in a manner as illustrated in FIG. 3. Once the fluid is transferred from the inlet 11 to the rotor lower surface 24, the fluid is divided by the outer grooves 632 and the inner grooves 631 of the lower thrust dynamic pressure grooves 63 into a portion which is transferred toward the rotor outer circumferential surface 21 and a portion which is transferred toward the rotor inner circumferential surface 22. The portion of the fluid which is transferred toward the rotor outer circumferential surface 21 passes the second dynamic pressure grooves 70, and is discharged through the outlet 12. Further, the portion of the fluid which is transferred toward the rotor inner circumferential surface 22 supports the rotation of the rotor portion 20 through the first dynamic pressure grooves 60.

Accordingly, the rotation of the rotor portion 20 is supported by the single type of fluid transferred from the inlet into the space inside the rotor accommodating portion 13, while the rotor portion 20 is able to perform the transfer of the fluid. In addition, the rotor portion 20 is capable of rotating without making contact with the rotor accommodating portion 13 or the shaft portion 30 because of the dynamic pressures generated by the first dynamic pressure grooves 60. The non-connect rotation of the rotor portion 20 contributes to reducing, for example, damage to or degradation of the fluid. Further, because wear of the rotor portion 20, the rotor accommodating portion 13, and the shaft portion 30 due to a contact of the rotor portion 20 with the rotor accommodating portion 13 or the shaft portion 30 does not occur, generation of dust can be reduced.

According to the present preferred embodiment, the plurality of herringbone grooves and the plurality of spiral grooves are arranged to have the same ratio of a groove width to a hill width. That is, the ratio of the groove width to the hill width of each dynamic pressure groove array as measured in the circumferential direction is 1 to 1. Note that this ratio of the groove width to the hill width is not essential to the present invention. For example, the hill width may be greater than the groove width. Further, each of the plurality of herringbone grooves may be arranged to have a smaller groove width at the bend portion 611 than at an end portion of at least one of the outside dynamic pressure groove 612 and the inside dynamic pressure groove 613. Furthermore, each of the upper thrust dynamic pressure grooves 62 and the lower thrust dynamic pressure grooves 63 may be arranged to have a smaller groove width on a side closer to the rotor inner circumferential surface 22 than on a side closer to the rotor outer circumferential surface 21. Different ratios of the groove width to the hill width may be combined appropriately. An appropriate combination of different ratios of the groove width to the hill width contributes to improving the rotational accuracy of the rotor portion 20. An improvement in the rotational accuracy of the rotor portion 20 leads to reduced vibration of the pump 1 and reduced variations in the amount of the fluid being transferred.

In addition, according to the present preferred embodiment, each of the plurality of herringbone grooves and the plurality of spiral grooves is arranged to have a uniform groove depth. That is, each dynamic pressure groove is arranged to have a uniform groove depth from one end to an opposite end thereof. Note, however, that each dynamic pressure groove may not necessarily be arranged to have a uniform groove depth from one end to the opposite end thereof. For example, each dynamic pressure groove may be arranged to vary in groove depth. For example, each of the plurality of herringbone grooves may be arranged to have a smaller groove depth at the bend portion 611 than at the end portion of at least one of the outside dynamic pressure groove 612 and the inside dynamic pressure groove 613. Further, each of the upper thrust dynamic pressure grooves 62 and the lower thrust dynamic pressure grooves 63 may be arranged to have a smaller groove depth on the side closer to the rotor inner circumferential surface 22 than on the side closer to the rotor outer circumferential surface 21. Different groove depths may be combined appropriately. An appropriate combination of different groove depths contributes to improving the rotational accuracy of the rotor portion 20. An improvement in the rotational accuracy of the rotor portion 20 leads to reduced vibration of the pump 1 and reduced variations in the amount of the fluid being transferred.

Figure 5:
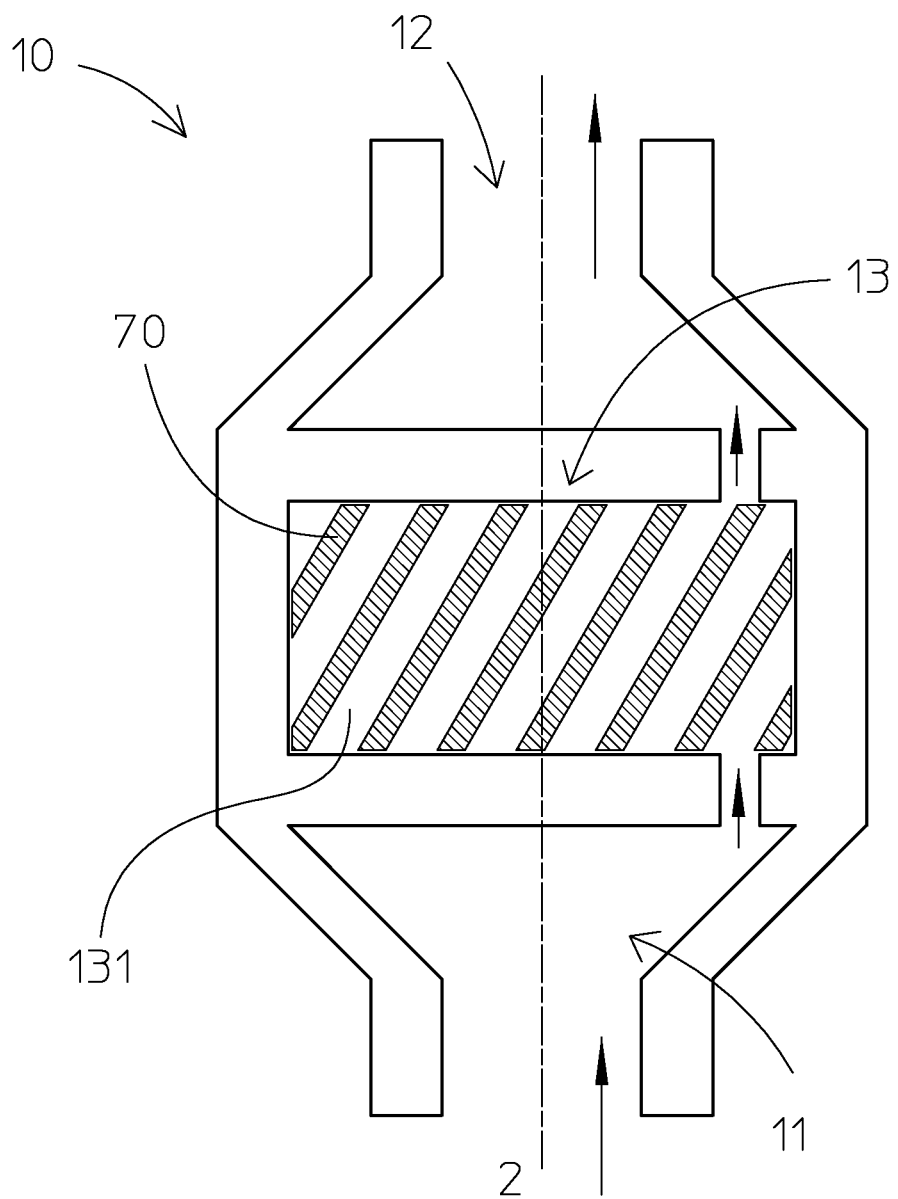
FIG. 5 is a vertical cross-sectional view of a housing according to the first preferred embodiment of the present invention.

FIG. 5 shows a vertical cross-sectional view of the rotor accommodating portion 13 of the housing 10. According to the present preferred embodiment, the second dynamic pressure grooves 70 are defined in the housing inner circumferential surface 131 at an inside of the rotor accommodating portion 13. The second dynamic pressure grooves 70 are a plurality of spiral grooves. The second dynamic pressure grooves 70 are arranged in such an orientation that once the rotor portion 20 starts rotating about the central axis, i.e., the rotation axis 2, the fluid is transferred from the inlet 11 to the outlet 12. Each second dynamic pressure groove 70 is arranged to extend in a direction at an angle to the central axis. More preferably, each second dynamic pressure groove 70 is arranged to have an axial dimension greater than an axial dimension of the rotor portion 20. Arranging each second dynamic pressure groove 70 to have an axial dimension greater than the axial dimension of the rotor portion 20 leads to an increase in an area over which a pumping force acts to transfer the fluid, resulting in increased transfer pressure.

Figure 6:
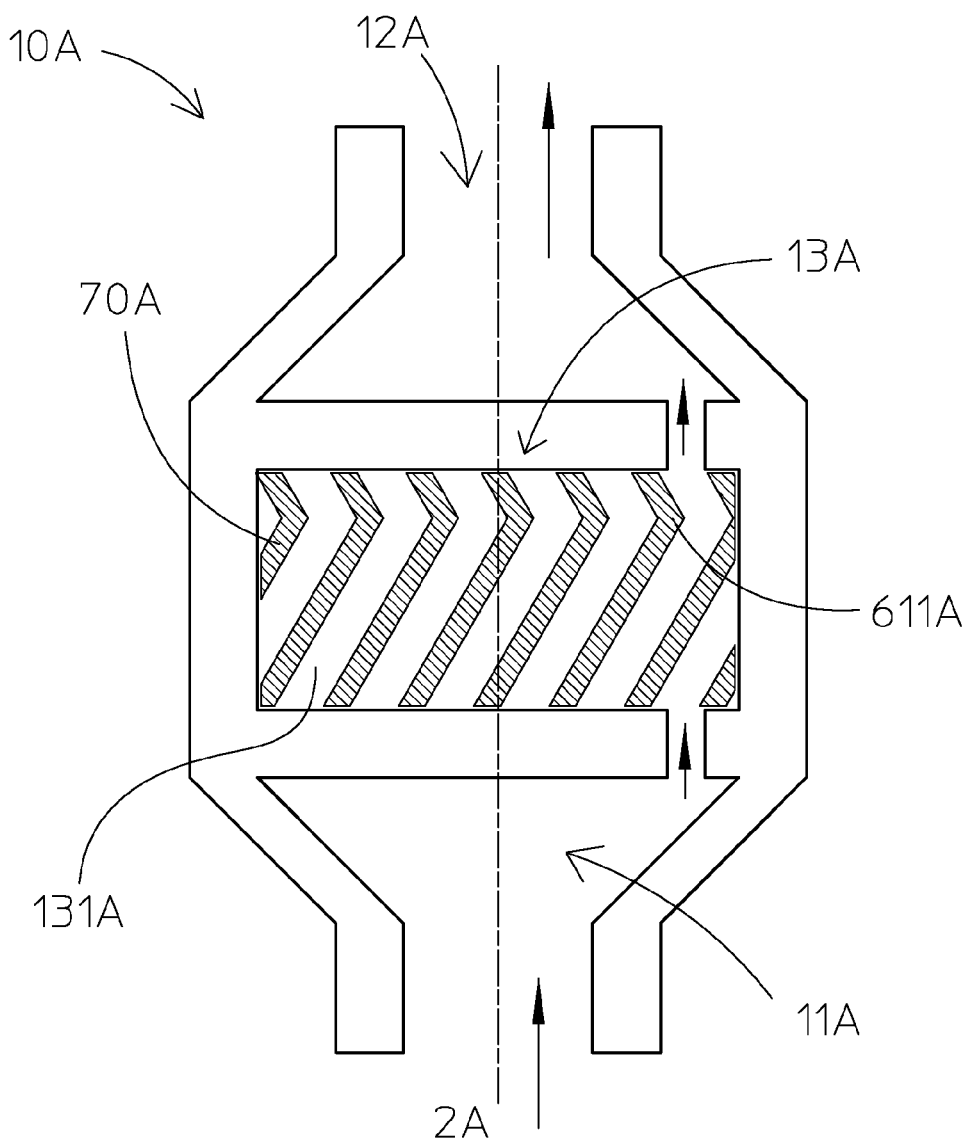
FIG. 6 is a vertical cross-sectional view of a housing according to a modification of the first preferred embodiment of the present invention.
Figure 7:
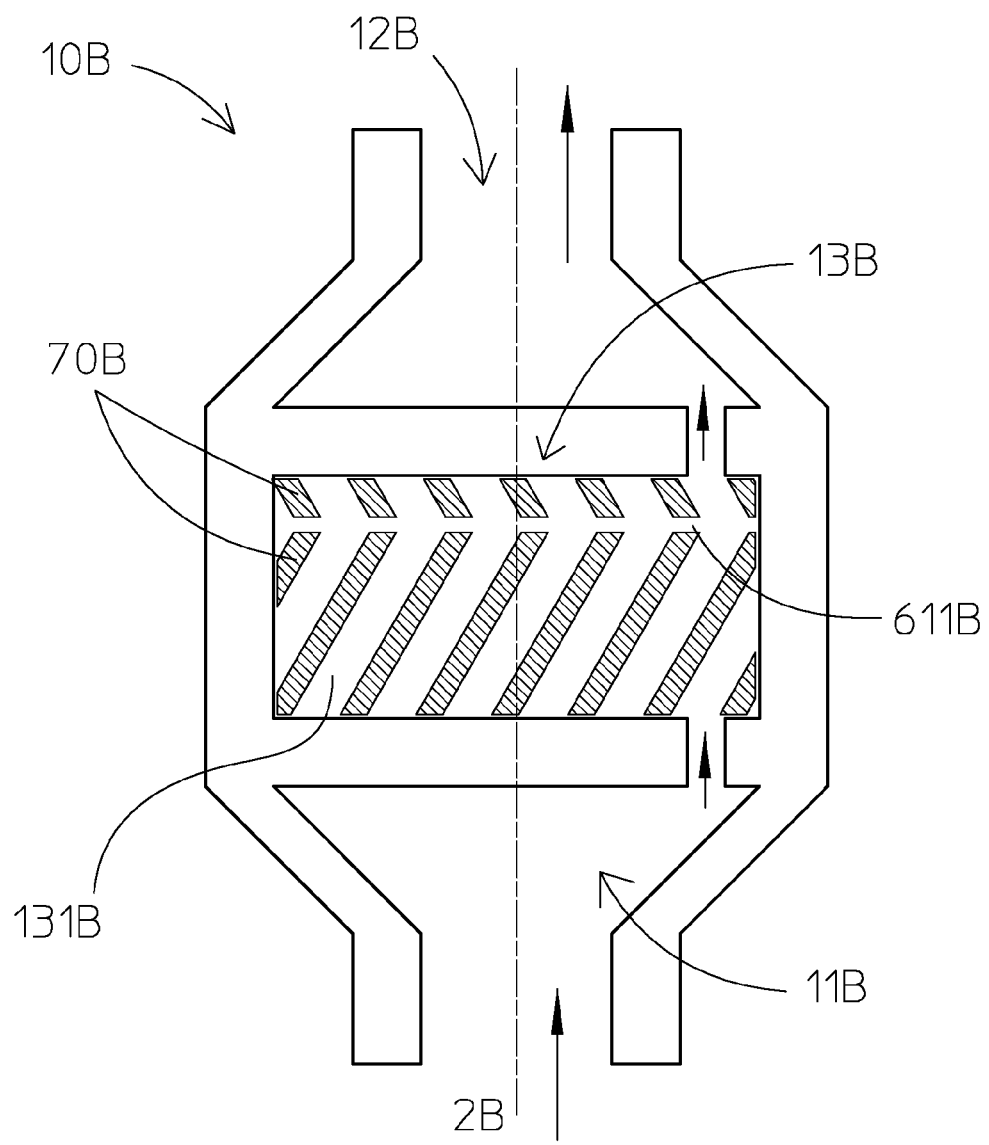
FIG. 7 is a vertical cross-sectional view of a housing according to a modification of the first preferred embodiment of the present invention.

FIGS. 6 and 7 each is a vertical cross-sectional view of a modification of the housing 10 in which the second dynamic pressure grooves 70 have been modified. Referring to FIGS. 6 and 7, second dynamic pressure grooves 70A of a housing 10A according to a modification of the first preferred embodiment are a plurality of herringbone grooves arranged in the circumferential direction in a housing inner circumferential surface 131A, and second dynamic pressure grooves 70B of a housing 10B according to a modification of the first preferred embodiment are a plurality of herringbone grooves arranged in the circumferential direction in a housing inner circumferential surface 131B.

Referring to FIG. 6, the second dynamic pressure grooves 70A are a plurality of herringbone grooves each of which includes a bend portion 611A and portions extending in different directions from the bend portion 611A. More preferably, a portion of each second dynamic pressure groove 70A which extends from the bend portion 611A toward an inlet 11A is arranged to be longer than a portion of the second dynamic pressure groove 70A which extends from the bend portion 611A toward an outlet 12A. A great length of the portion of the second dynamic pressure groove 70A which extends from the bend portion 611A toward the inlet 11A enables a fluid to be transferred from the inlet 11A to the outlet 12A once a rotor portion starts rotating about a central axis, i.e., a rotation axis 2A. In addition, a dynamic pressure of a portion of the fluid which has been drawn to the bend portion 611A contributes to reducing wobbling of the rotor portion and improving rotational accuracy of the rotor portion. An improvement in the rotational accuracy of the rotor portion leads to reduced vibration of a pump and reduced variations in the amount of the fluid being transferred.

Referring to FIG. 7, the second dynamic pressure grooves 70B are a plurality of herringbone grooves each of which includes a bend portion 611B and portions extending in different directions from the bend portion 611B. The portions of each second dynamic pressure groove 70B which extend in different directions from the bend portion 611B are not joined to each other at the bend portion 611B. That is, a hill portion is defined at the bend portion 611B. A gap between the bend portion 611B and a rotor outer circumferential surface is smaller than a gap which would be defined between the rotor outer circumferential surface and the bend portion 611B if the bend portion 611B were defined by a groove portion as the bend portion 611A illustrated in FIG. 6, and this contributes to increasing a dynamic pressure generated thereat. Therefore, once a rotor portion starts rotating about a central axis, i.e., a rotation axis 2B, a dynamic pressure of a portion of a fluid which is drawn to the bend portion 611B more effectively contributes to reducing wobbling of the rotor portion and improving rotational accuracy of the rotor portion. An improvement in the rotational accuracy of the rotor portion leads to reduced vibration of a pump and reduced variations in the amount of the fluid being transferred.

Referring to FIG. 1, the magnet 50 is arranged radially opposite to the second dynamic pressure grooves 70. In addition, the stator 40 is arranged radially opposite to the magnet 50. A reduction in an axial dimension of the pump 1 can be achieved by arranging the magnet 50, the stator 40, and the second dynamic pressure grooves 70 radially opposite to one another.

Figure 8:
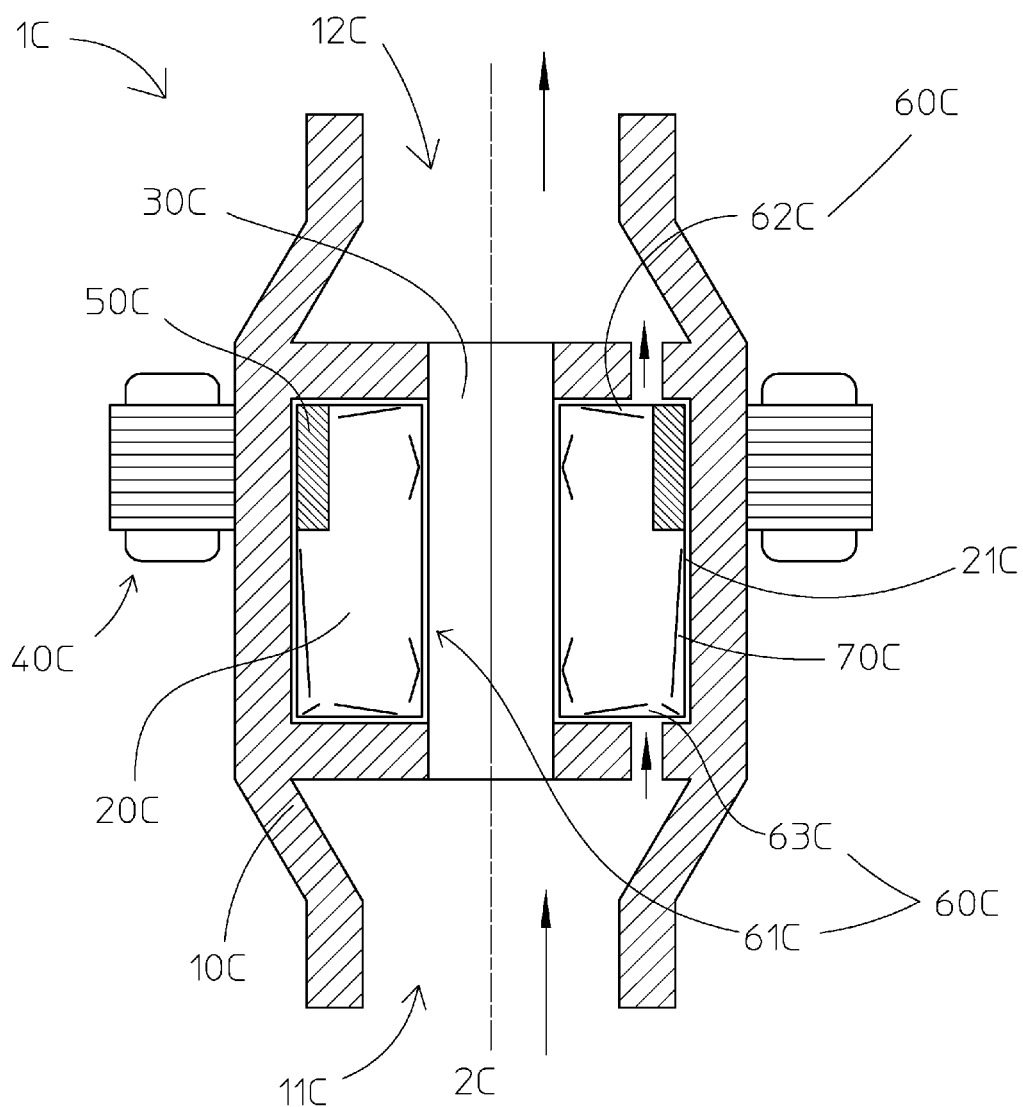
FIG. 8 is a vertical cross-sectional view of a pump according to a modification of the first preferred embodiment of the present invention.

FIG. 8 is a vertical cross-sectional view of a pump 1C according to a modification of the first preferred embodiment. A rotor portion 20C includes a magnet 50C, first dynamic pressure grooves 60C, and second dynamic pressure grooves 70C. Only differences from the first preferred embodiment illustrated in FIG. 1 will be described below.

The magnet 50C is arranged in the vicinity of a rotor outer circumferential surface 21C. In addition, the magnet 50C and the second dynamic pressure grooves 70C are arranged one above the other in the axial direction. In the present modification of the first preferred embodiment, the magnet 50C is arranged on a side of the second dynamic pressure grooves 70C closer to an outlet 12C. Note that the magnet 50C may alternatively be arranged on a side of the second dynamic pressure grooves 70C closer to an inlet 11C. Also note that a portion of the magnet 50C may be arranged to radially overlap with the second dynamic pressure grooves 70C. A reduction in a radial dimension of the pump 1C can be achieved by arranging the magnet 50C and the second dynamic pressure grooves 70C one above the other in the axial direction.

Referring to FIGS. 1 and 8, the axial and radial dimensions of the pump can be changed by changing positions of the magnet and the second dynamic pressure grooves in the rotor portion. Thus, it is possible to provide pumps with a reduced thickness and having various measurements in accordance with the shape of electronic devices or the like.

Figure 9:
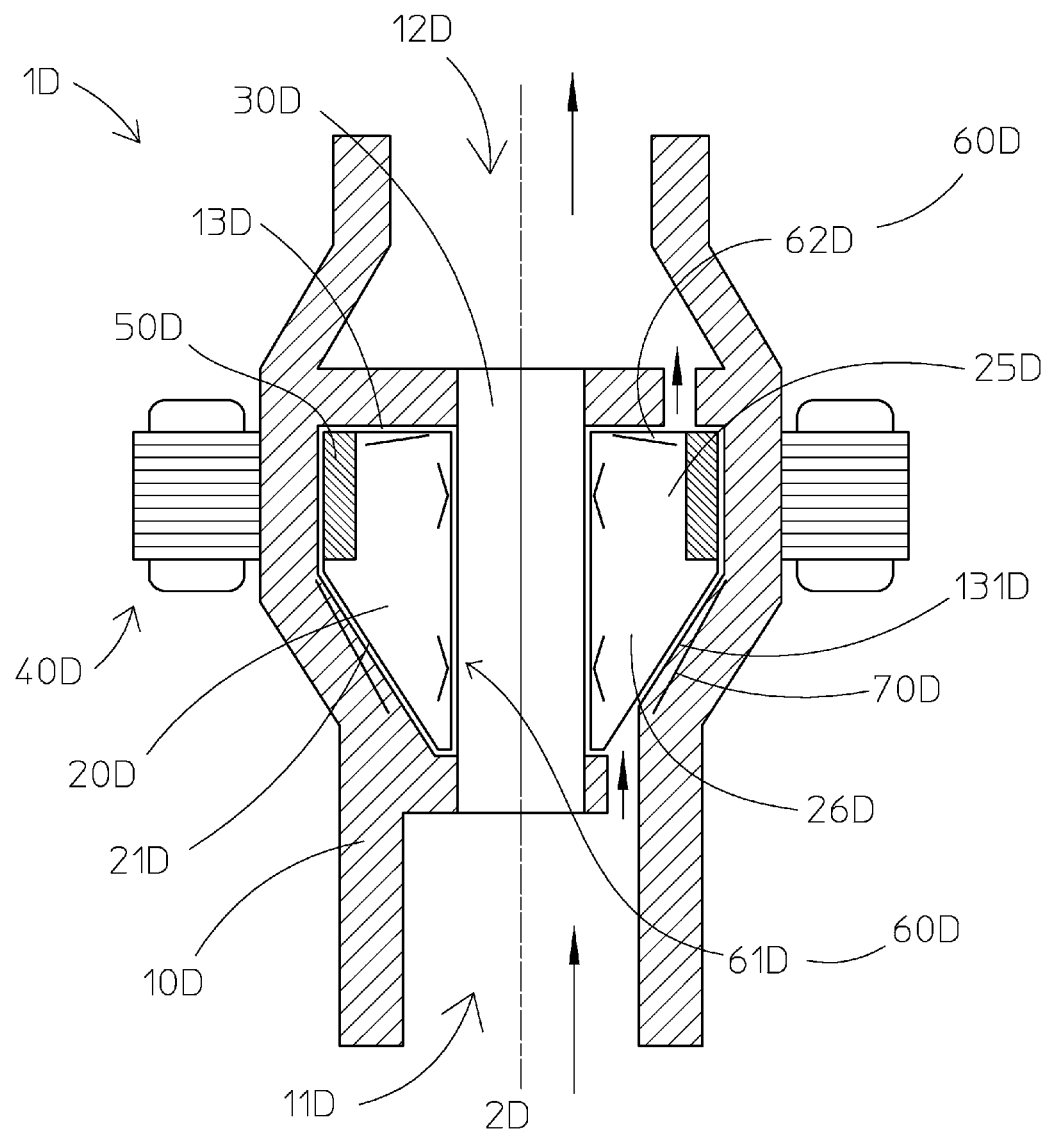
FIG. 9 is a vertical cross-sectional view of a pump according to a modification of the first preferred embodiment of the present invention.

FIG. 9 is a vertical cross-sectional view of a pump 1D according to a modification of the first preferred embodiment. A rotor portion 20D includes a rotor cylindrical portion 25D and a rotor inclined portion 26D. In addition, a rotor accommodating portion 13D includes an inclined surface and a cylindrical surface arranged opposite to an outer circumferential surface of the rotor portion 20D with a gap intervening therebetween in accordance with the shape of the rotor portion 20D. A magnet 50D is arranged in the vicinity of an outer circumferential surface of the rotor cylindrical portion 25D, and is arranged radially opposite to a stator 40D. Second dynamic pressure grooves 70D are defined in a housing inner circumferential surface 131D of the rotor accommodating portion 13D. In the present modification of the first preferred embodiment, the second dynamic pressure grooves 70D are defined in an inclined surface of the housing inner circumferential surface 131D. Note that the second dynamic pressure grooves 70D may alternatively be defined in a cylindrical surface of the housing inner circumferential surface 131D. Also note that the second dynamic pressure grooves 70D may alternatively be defined in a portion of a rotor outer circumferential surface 21D which defines an outer circumferential surface of the rotor inclined portion 26D.

An inlet 11D is arranged to have an opening at a portion of the rotor accommodating portion 13D which is opposed to a portion of the rotor inclined portion 26D which has a small radial dimension. Once the rotor portion 20D starts rotating about a central axis, i.e., a rotation axis 2D, the second dynamic pressure grooves 70D cause a fluid to be transferred from a side where the rotor inclined portion 26D has a smaller radial dimension to a side where the rotor inclined portion 26D has a greater radial dimension. In addition, a centrifugal force causes the fluid to be transferred from the side where the rotor inclined portion 26D has a smaller radial dimension to the side where the rotor inclined portion 26D has a greater radial dimension, in accordance with the shape of the rotor inclined portion 26D. That is, combined action of a transferring force produced by the second dynamic pressure grooves 70D and the centrifugal force due to the rotor inclined portion 26D increases a transfer pressure on the fluid.

In the present modification of the first preferred embodiment, the magnet 50D and the second dynamic pressure grooves 70D are arranged one above the other in the axial direction. Note, however, that this is not essential to the present invention, and that a portion of the magnet 50D may be arranged to radially overlap with the second dynamic pressure grooves 70D. Also note that the magnet 50D may be arranged radially opposite to the second dynamic pressure grooves 70D. A reduction in an axial dimension of the pump 1D can be achieved by arranging the magnet 50D and the second dynamic pressure grooves 70D to radially overlap with each other. Also note that, in the case where the magnet 50D is arranged radially opposite to the second dynamic pressure grooves 70D, the rotor portion 20D may be arranged to include no rotor cylindrical portion 25D. This leads to a further reduction in the axial dimension of the pump 1D.

Figure 10:
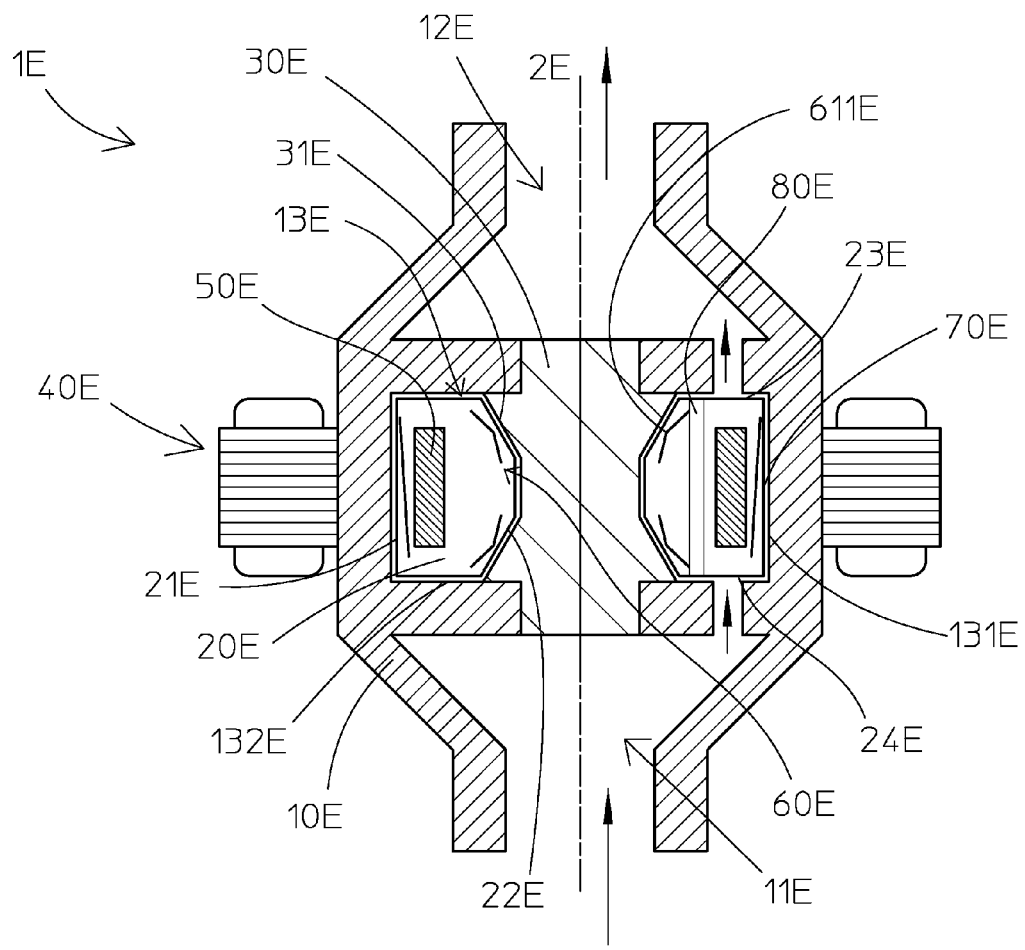
FIG. 10 is a vertical cross-sectional view of a pump according to a modification of the first preferred embodiment of the present invention.

FIG. 10 is a vertical cross-sectional view of a pump 10E according to a modification of the first preferred embodiment. Only differences from the first preferred embodiment illustrated in FIG. 1 will be described below.

A shaft portion 30E includes two shaft outer circumferential surfaces 31E each of which is inclined to decrease an outside diameter of the shaft portion 30E from an end portion toward a middle portion of the shaft portion 30E. In addition, a rotor portion 20E includes two rotor inner circumferential surfaces 22E each of which is arranged opposite to a separate one of the shaft outer circumferential surfaces 31E with a gap intervening therebetween. Each of the rotor inner circumferential surfaces 22E is a surface which is inclined to decrease an inside diameter of the rotor portion 20E from a rotor upper surface 23E or a rotor lower surface 24E toward a middle portion of the rotor portion 20E. A cylindrical or substantially cylindrical surface is arranged between the two shaft outer circumferential surfaces 31E and between the two rotor inner circumferential surfaces 22E. Note that the cylindrical or substantially cylindrical surface may not be provided, with the two shaft outer circumferential surfaces 31E being continuous with each other and the two rotor inner circumferential surfaces 22E being continuous with each other.

First dynamic pressure grooves 60E are defined in at least one of the shaft outer circumferential surfaces 31E and the rotor inner circumferential surfaces 22E. In the present modification of the first preferred embodiment, the first dynamic pressure grooves 60E are a plurality of herringbone grooves. The plurality of herringbone grooves are arranged in such a manner that once the rotor portion 20E starts rotating about a central axis, i.e., a rotation axis 2E, a portion of a fluid is drawn to a bend portion 611E of each herringbone groove. Each first dynamic pressure groove 60E generates a radial dynamic pressure and a thrust dynamic pressure at the same time through the portion of the fluid which has been drawn to the bend portion 611E. Accordingly, the rotor portion 20E does not need to include both radial dynamic pressure grooves and thrust dynamic pressure grooves. One herringbone groove array is able to produce dynamic pressure action of the radial dynamic pressure grooves and dynamic pressure action of the thrust dynamic pressure grooves at the same time. Two dynamic pressure groove arrays each of which is made up of a plurality of herringbone grooves are arranged one above the other in the axial direction, and this contributes to reducing wobbling of the rotor portion 20E and improving rotational accuracy of the rotor portion 20E. An improvement in the rotational accuracy of the rotor portion 20E leads to reduced vibration of the pump 1E and reduced variations in the amount of the fluid being transferred.

In the present modification of the first preferred embodiment, the plurality of herringbone grooves are defined in each of the two inclined surfaces arranged one above the other in the axial direction. Note, however, that this is not essential to the present invention. For example, one of the two dynamic pressure groove arrays may be arranged in one of the inclined surfaces as illustrated in FIG. 10, and the other dynamic pressure groove array may include separate dynamic pressure groove arrays which are made up of the radial dynamic pressure grooves and the thrust dynamic pressure grooves, respectively, as illustrated in FIG. 1.

Figure 11:
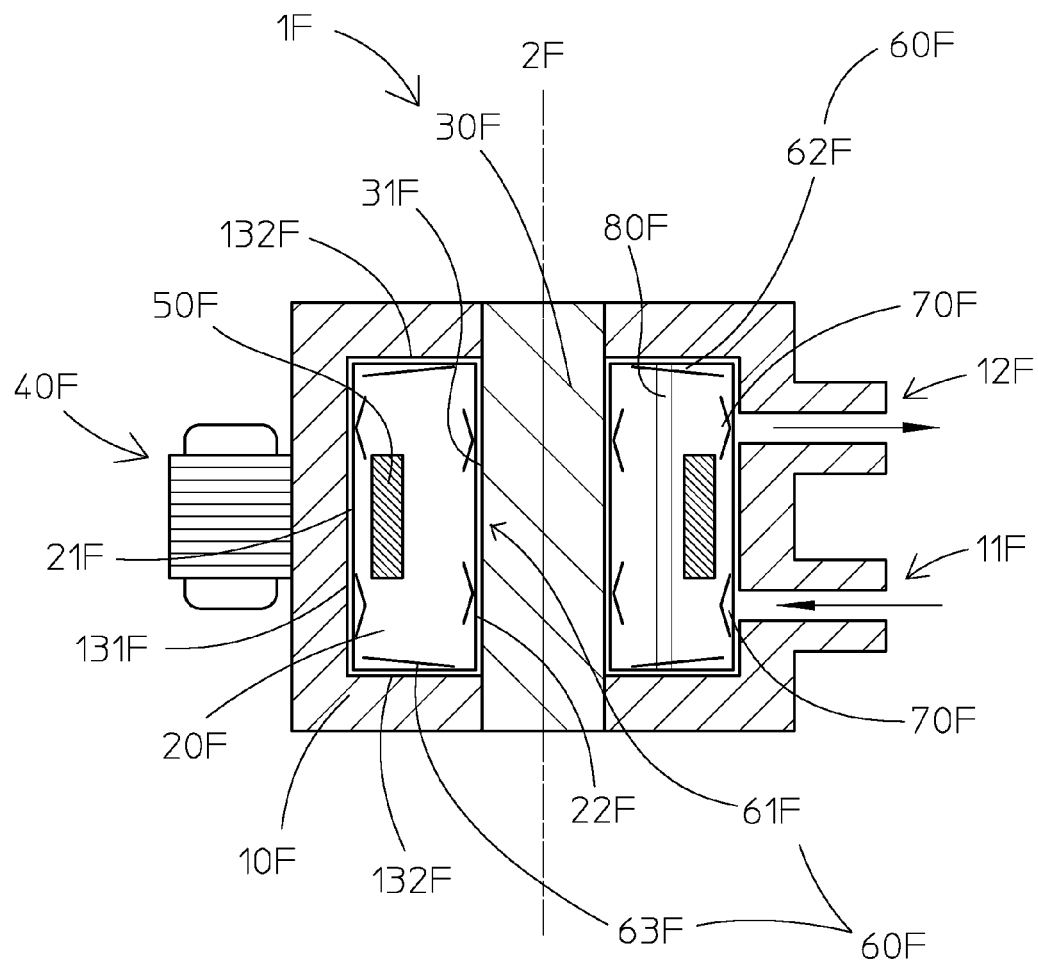
FIG. 11 is a vertical cross-sectional view of a pump according to a second preferred embodiment of the present invention.

FIG. 11 is a vertical cross-sectional view of a pump 1F according to a second preferred embodiment of the present invention. Referring to FIG. 11, the pump 1F according to the present preferred embodiment includes a housing 10F, a rotor portion 20F, and a shaft portion 30F. Only differences from the first preferred embodiment illustrated in FIG. 1 will be described below.

The housing 10F is a case connected to a pipe which is used to transfer a fluid. The housing 10F includes connections to connect the housing 10F to the pipe. The pipe is connected to an inlet 11F through which the fluid flows into the pump 1F, and an outlet 12F through which the fluid is discharged out of the pump 1F. Each of the inlet 11F and the outlet 12F is arranged to pass through a portion of the housing 10F to have an opening in a housing inner circumferential surface 131F. Note that each of the inlet 11F and the outlet 12F may alternatively be arranged to have an opening at another position, and that one of the inlet 11F and the outlet 12F may alternatively be arranged to have an opening in an inner surface 132F.

The inlet 11F is arranged to open into a space inside a rotor accommodating portion 13F. In addition, the outlet 12F is arranged to open into the space inside the rotor accommodating portion 13F. That is, the inlet 11F is arranged to be in communication with the outlet 12F through the space inside the rotor accommodating portion 13F.

The rotor portion 20F is arranged to have the shaft portion 30F as a central axis thereof, is substantially cylindrical, and is arranged to have the shaft portion 30F inserted therethrough in an axial direction. Further, the rotor portion 20F is arranged inside the rotor accommodating portion 13F. A magnet 50F is arranged in the vicinity of a rotor outer circumferential surface 21F of the rotor portion 20F. The magnet 50F is arranged radially opposite to a stator 40F. That is, the shaft portion 30F, the magnet 50F, and the stator 40F are arranged to radially overlap with one another.

At least one of the rotor outer circumferential surface 21F and the housing inner circumferential surface 131F includes second dynamic pressure grooves 70F. Note that the second dynamic pressure grooves 70F may be defined in both the rotor outer circumferential surface 21F and the housing inner circumferential surface 131F.

The fluid is arranged in a space including the inlet 11F, the outlet 12F, and the space inside the rotor accommodating portion 13F. Rotation of the rotor portion 20F causes pumping action to be produced at the second dynamic pressure grooves 70F to transfer the fluid from the inlet 11F to the outlet 12F. In addition, because the space inside the rotor accommodating portion 13F is filled with the fluid, dynamic pressures are generated by first dynamic pressure grooves 60F between the rotor portion 20F and the shaft portion 30F and between the rotor portion 20F and the rotor accommodating portion 13F. The rotation of the rotor portion 20F is supported by these dynamic pressures. The rotor portion 20F is arranged to rotate in a non-contact condition inside the rotor accommodating portion 13F due to the dynamic pressures generated by the first dynamic pressure grooves 60F and the second dynamic pressure grooves 70F. Thus, the rotor portion 20F rotates without making contact with the shaft portion 30F or the housing 10F. Wear of the rotor portion 20F, the shaft portion 30F, and the housing 10F does not occur, which contributes to prolonging a life of the pump 1F. Moreover, the non-contact condition of the rotor portion 20F enables the fluid to be transferred while preventing, for example, damage to or degradation of the fluid from occurring. Furthermore, a gap between a shaft outer circumferential surface 31F and a rotor inner circumferential surface 22F is arranged to have a width smaller than the width of a gap between the housing inner circumferential surface 131F and the rotor outer circumferential surface 21F. The fact that the width of the gap between the shaft outer circumferential surface 31F and the rotor inner circumferential surface 22F is smaller than the width of the gap between the housing inner circumferential surface 131F and the rotor outer circumferential surface 21F contributes to reducing wobbling of the rotor portion 20F and improving rotational accuracy of the rotor portion 20F. An improvement in the rotational accuracy of the rotor portion 20F leads to reduced vibration of the pump 1F and reduced variations in the amount of the fluid being transferred.

Figure 12:
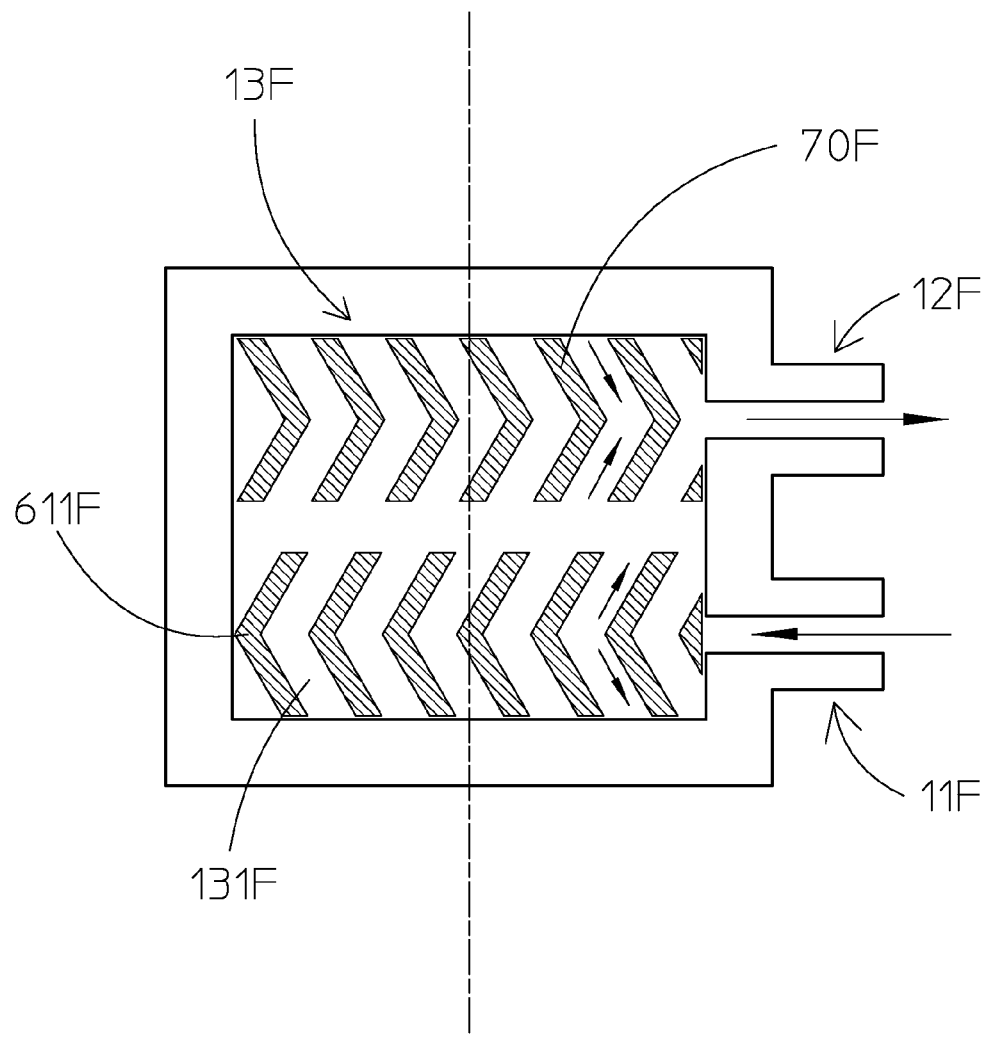
FIG. 12 is a vertical cross-sectional view of a housing according to the second preferred embodiment of the present invention.

FIG. 12 shows a cross-sectional view of the rotor accommodating portion 13F of the housing 10F. According to the present preferred embodiment, the second dynamic pressure grooves 70F are defined in the housing inner circumferential surface 131F at an inside of the rotor accommodating portion 13F. The second dynamic pressure grooves 70F are a plurality of herringbone grooves, and include two dynamic pressure groove arrays arranged one above the other in the axial direction. The two dynamic pressure groove arrays are arranged in different orientations along a circumferential direction. Each of the plurality of herringbone grooves includes a bend portion 611F. Preferably, axial positions of the bend portions 611F of the second dynamic pressure grooves 70F of the respective dynamic pressure groove arrays are arranged to overlap with axial positions of the inlet 11F and the outlet 12F, respectively.

More specifically, the axial positions of the bend portions 611F of the second dynamic pressure grooves 70F of one of the dynamic pressure groove arrays are arranged to overlap with the axial position of the inlet 11F. Moreover, the plurality of herringbone grooves are arranged in such a manner that once the rotor portion 20F starts rotating about the central axis, i.e., a rotation axis 2F, the one of the dynamic pressure groove arrays acts to draw in the fluid through the inlet 11F.

The axial positions of the bend portions 611F of the second dynamic pressure grooves 70F of the other one of the dynamic pressure groove arrays are arranged to overlap with the axial position of the outlet 12F. Moreover, the plurality of herringbone grooves are arranged in such a manner that once the rotor portion 20F starts rotating about the central axis, i.e., the rotation axis 2F, the other dynamic pressure groove array acts to discharge the fluid through the outlet 12F. That is, one of the two dynamic pressure groove arrays is arranged to act to draw in the fluid through the inlet 11F, while the other one of the two dynamic pressure groove arrays is arranged to act to discharge the fluid through the outlet 12F. More specifically, the rotation of the rotor portion 20F causes the dynamic pressure groove array arranged near the inlet 11F to draw the fluid into the space inside the rotor accommodating portion 13F, with the fluid flowing along portions of each dynamic pressure groove of the dynamic pressure groove array which extend upward and downward from the bend portion 611F. On the other hand, the rotation of the rotor portion 20F causes the fluid to be drawn to the bend portion 611F of each dynamic pressure groove of the dynamic pressure groove array arranged near the outlet 12F, with the fluid flowing along portions of each dynamic pressure groove of the dynamic pressure groove array which extend upward and downward from the bend portion 611F. The fluid is discharged through the outlet 12F as the axial position of the bend portion 611F of each dynamic pressure groove of the dynamic pressure groove array is arranged to overlap with the axial position of the outlet 12F.

Figure 13:
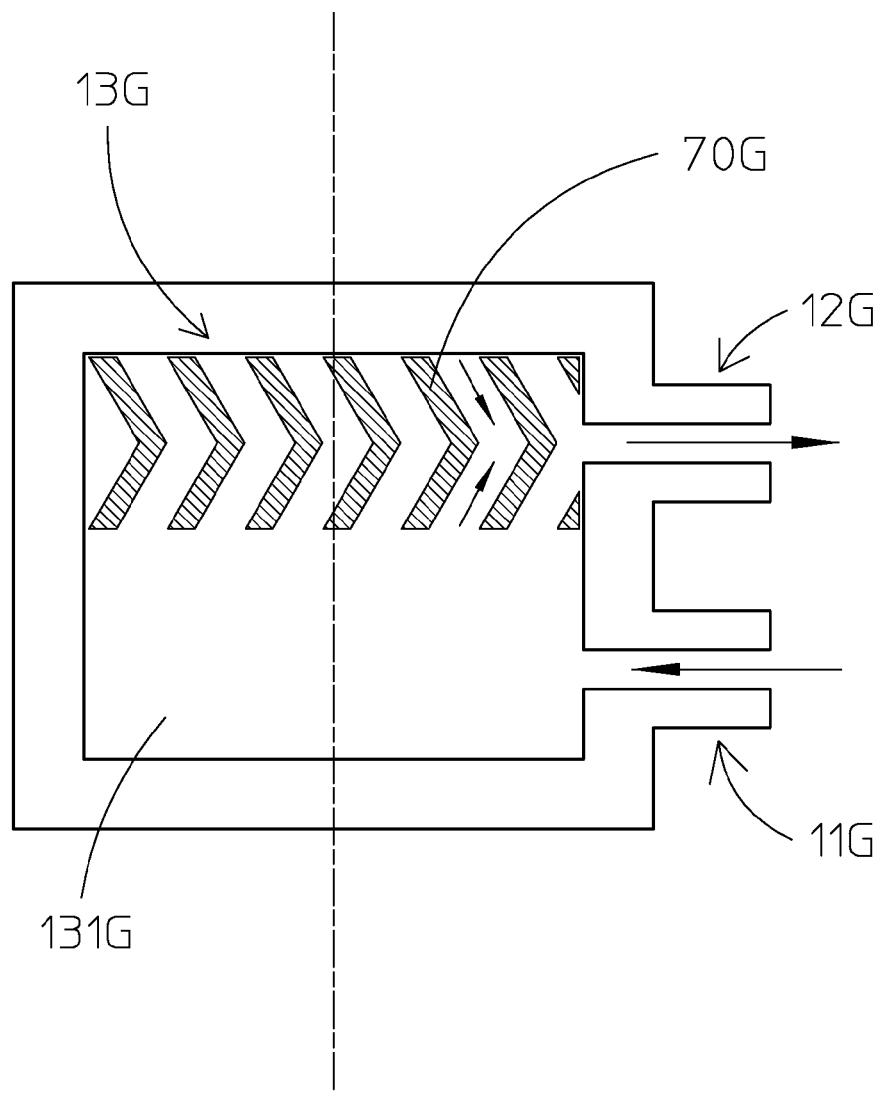
FIG. 13 is a vertical cross-sectional view of a housing according to a modification of the second preferred embodiment of the present invention.
Figure 14:
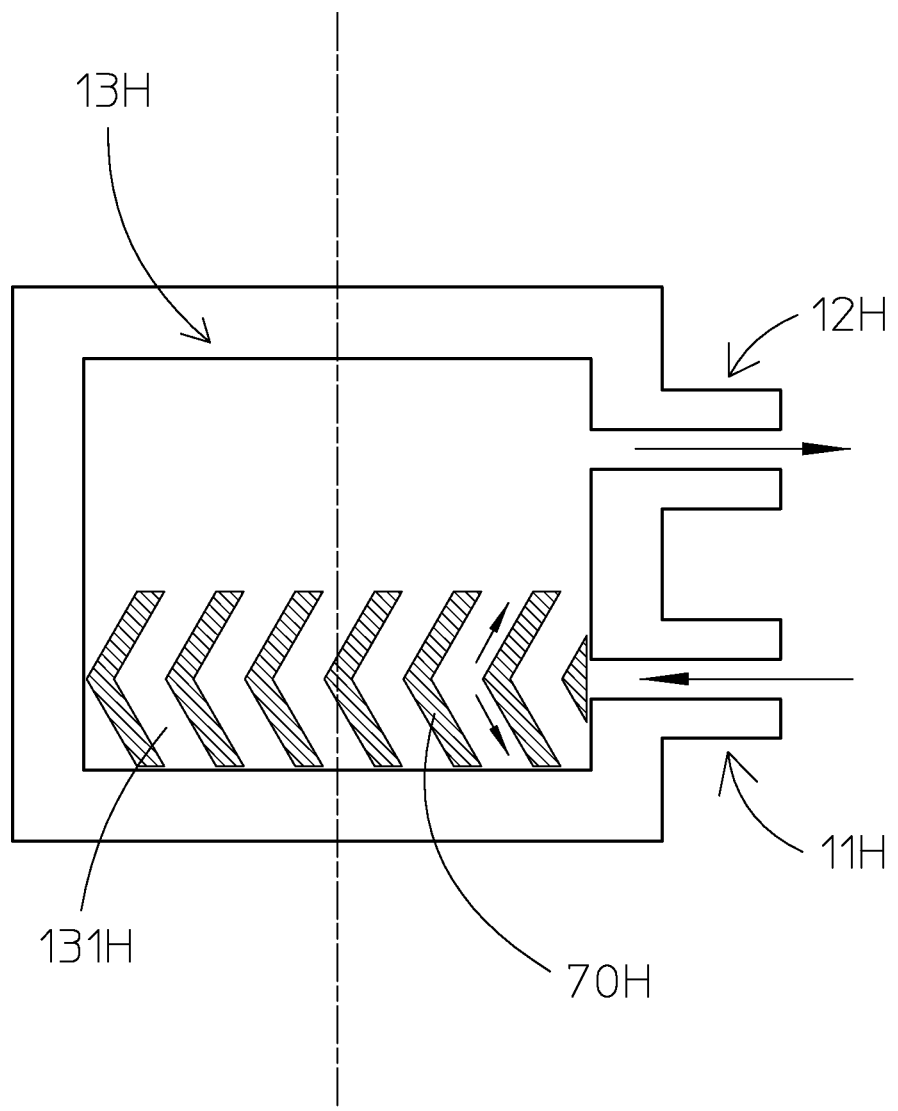
FIG. 14 is a vertical cross-sectional view of a housing according to a modification of the second preferred embodiment of the present invention.

In FIG. 12, two sets of a plurality of herringbone grooves are arranged one above the other in the axial direction. Note that, as illustrated in FIG. 13, a plurality of herringbone grooves may be arranged only on a side near an outlet 12G. Also note that, as illustrated in FIG. 14, a plurality of herringbone grooves may be arranged only on a side near an inlet 11H.

Figure 15:
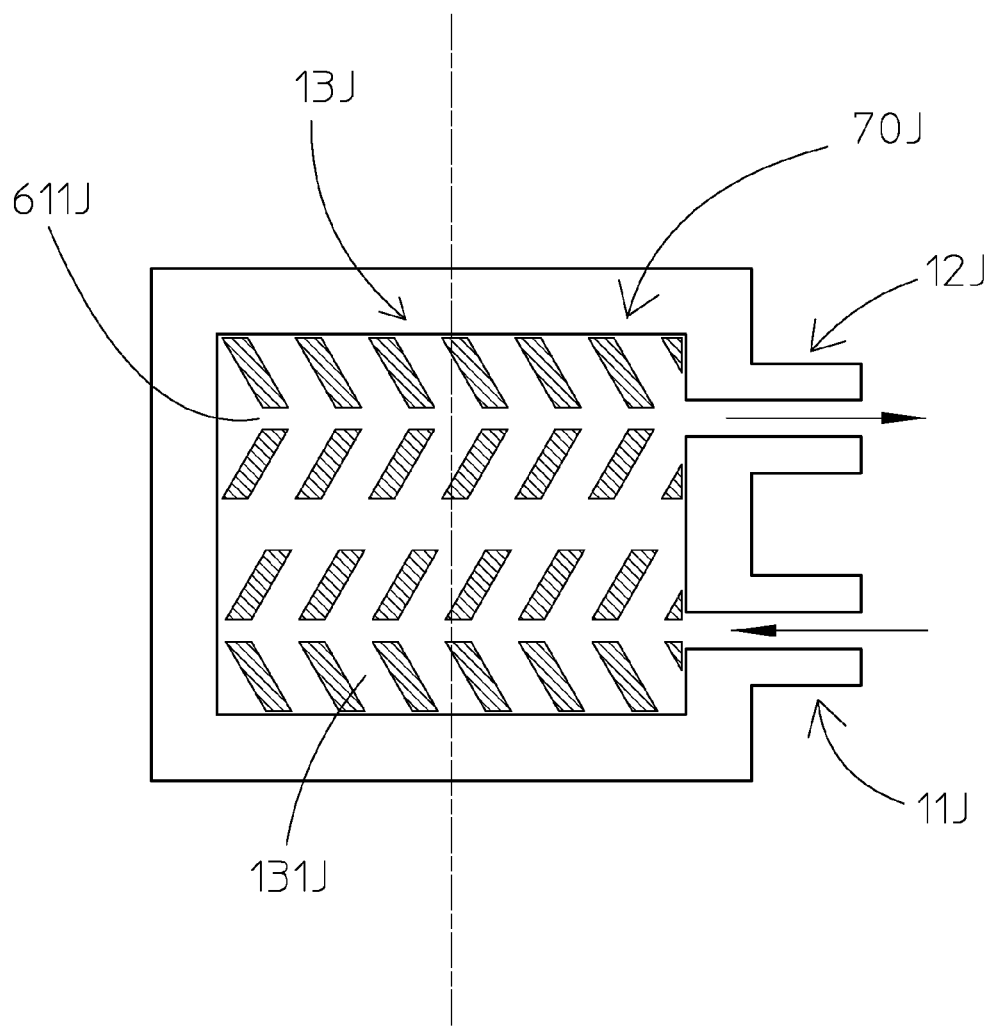
FIG. 15 is a vertical cross-sectional view of a housing according to a modification of the second preferred embodiment of the present invention.

Referring to FIG. 15, second dynamic pressure grooves 70J are a plurality of herringbone grooves each of which includes a bend portion 611J and portions extending in different directions from the bend portion 611J. The portions of each second dynamic pressure groove 70J which extend in different directions from the bend portion 611J are not joined to each other at the bend portion 611J. That is, a hill portion is defined at the bend portion 611J. A gap between the bend portion 611J and a rotor outer circumferential surface is smaller than a gap which would be defined between the rotor outer circumferential surface and the bend portion 611J if the bend portion 611J were defined by a groove portion as the bend portion 611F illustrated in FIG. 12, and this contributes to increasing a dynamic pressure generated thereat. Accordingly, once a rotor portion starts rotating about a central axis, i.e., a rotation axis, a dynamic pressure generated at each bend portion 611J increases a transfer pressure on a fluid.

Referring to FIG. 1, according to the first preferred embodiment, the rotor portion 20 includes a through hole 80 arranged to pass therethrough in the axial direction. The through hole 80 is arranged to have an opening in each of the rotor upper surface 23 and the rotor lower surface 24. Note that the through hole 80 may alternatively be arranged to have an opening in at least one of the rotor upper surface 23 and the rotor lower surface 24. The through hole 80 is preferably arranged to be parallel to the central axis, i.e., the rotation axis 2. Note that the through hole 80 may alternatively be arranged to extend in a direction at an angle to the central axis. More preferably, the through hole 80 is arranged on a radially inner side, i.e., a side closer to the central axis, of portions of the inlet 11 and the outlet 12 defined in the rotor accommodating portion 13. In FIG. 3, the rotor upper surface 23 includes an upper opening portion 81, which is an opening of the through hole 80. In FIG. 4, the rotor lower surface 24 includes a lower opening portion 82, which is an opening of the through hole 80.

Once the rotor portion 20 starts rotating about the central axis, i.e., the rotation axis 2, the fluid is able to circulate through channels including the radial dynamic pressure grooves 61, the upper thrust dynamic pressure grooves 62, the lower thrust dynamic pressure grooves 63, and the through hole 80 inside the rotor accommodating portion 13. Circulation of the fluid through the channels contributes to reducing the wobbling of the rotor portion 20 and improving the rotational accuracy of the rotor portion 20. An improvement in the rotational accuracy of the rotor portion 20 leads to reduced vibration of the pump 1 and reduced variations in the amount of the fluid being transferred. Further, because the through hole 80 is arranged on the radially inner side of the portions of the inlet 11 and the outlet 12 defined in the rotor accommodating portion 13 as described above, transfer of the fluid from the inlet 11 to the outlet 12 is not hindered by the through hole 80.

Note that the fluid may flow in either direction through the through hole 80. That is, the fluid may flow either from the upper opening portion 81 to the lower opening portion or from the lower opening portion 82 to the upper opening portion 81 through the through hole 80.

According to the present preferred embodiment, an in-pipe pressure on the fluid flowing in the outlet is smaller than a maximum transfer pressure on the fluid generated by the second dynamic pressure grooves. More preferably, an in-pipe pressure in the inlet is equal to the in-pipe pressure in the outlet, and is smaller than the maximum transfer pressure generated by the second dynamic pressure grooves. Stable transfer of the fluid can be achieved by arranging the in-pipe pressures in the inlet and the outlet to be smaller than the transfer pressure generated by the second dynamic pressure grooves.

The amount of the fluid being transferred can be controlled by changing a rotation rate of the rotor portion. For example, increasing the rotation rate of the rotor portion increases a pumping force generated by the second dynamic pressure grooves. An increase in the pumping force results in an increase in the transfer pressure, increasing the amount of the fluid being transferred. In addition, the amount of the fluid being transferred can also be controlled by changing the number of second dynamic pressure grooves. For example, increasing the number of second dynamic pressure grooves increases the pumping force generated by the second dynamic pressure grooves. An increase in the pumping force results in an increase in the transfer pressure, increasing the amount of the fluid being transferred. The above techniques may be combined appropriately.

According to the present preferred embodiment, each first dynamic pressure groove is arranged to have a groove depth equivalent to or smaller than a groove depth of each second dynamic pressure groove. In addition, the first dynamic pressure grooves are arranged to have a hill width equivalent to or smaller than a hill width of the second dynamic pressure grooves. The amount of a portion of the fluid which flows into each first dynamic pressure groove can be reduced, and more of the fluid can be transferred to each second dynamic pressure groove, by arranging the groove depth of each first dynamic pressure groove to be smaller than the groove depth of each second dynamic pressure groove. In addition, the amount of the portion of the fluid which flows into each first dynamic pressure groove can be reduced, and more of the fluid can be transferred to each second dynamic pressure groove, by arranging the hill width of the first dynamic pressure grooves to be smaller than the hill width of the second dynamic pressure grooves.

According to the present preferred embodiment, the first dynamic pressure grooves and the second dynamic pressure grooves are defined by electrochemical machining using electrodes having the shape of grooves. By the electrochemical machining, each of the dynamic pressure grooves is defined to have highly accurate depth and width. Note that each of the dynamic pressure grooves may alternatively be defined by a cutting process. Also note that each of the dynamic pressure grooves may alternatively be defined by plastic deformation, for example, by press working. Also note that, in the case where the housing or the rotor portion is made of a resin material, each of the dynamic pressure grooves may be defined in an injection molding process using a mold for resin molding in which the shape of the dynamic pressure groove is previously defined. The above techniques may be combined appropriately.

Also note that pumps according to preferred embodiments of the present invention may be used for devices other than electronic devices. For example, a preferred embodiment of the present invention may be applied to transfer of a medicine in a medical appliance.

Also note that the detailed shape of each of the housing and the pump may be different from the shape thereof as illustrated in the accompanying drawings of the present application.

Also note that features of the above-described preferred embodiments and the modifications thereof may be combined appropriately as long as no conflict arises.

Preferred embodiments of the present invention are applicable to transfer of a refrigerant liquid to cool an electronic device.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A dynamic pressure bearing pump comprising: a shaft portion arranged to extend in a vertical direction; a rotor portion arranged to surround an outer circumference of the shaft portion, and including a magnet; and a housing joined to the shaft portion, and arranged to contain the rotor portion; wherein the housing includes: a stator arranged opposite to the magnet; a rotor accommodating portion arranged to accommodate the rotor portion; and an inlet and an outlet each of which is arranged to pass through a portion of the rotor accommodating portion; a surface of at least one of the rotor portion, the shaft portion, and the rotor accommodating portion includes at least one first dynamic pressure groove arranged to support rotation of the rotor portion; and a surface of at least one of the rotor portion and the rotor accommodating portion includes at least one second dynamic pressure groove arranged to transfer a fluid from the inlet to the outlet; the rotor portion is arranged to have the shaft portion as a central axis thereof, is substantially cylindrical, and is arranged to have the shaft portion inserted therethrough in an axial direction; the rotor portion includes: a rotor inner circumferential surface arranged opposite to a shaft outer circumferential surface of the shaft portion; a rotor outer circumferential surface arranged opposite to a housing inner circumferential surface of the rotor accommodating portion; and a rotor upper surface and a rotor lower surface each of which is perpendicular or substantially perpendicular to the shaft portion; at least one of the shaft outer circumferential surface and the rotor inner circumferential surface includes at least one radial dynamic pressure groove defined therein; at least one of an inner surface of the rotor accommodating portion, the rotor upper surface, and the rotor lower surface includes at least one thrust dynamic pressure groove defined therein; the at least one second dynamic pressure groove is defined in at least one of the housing inner circumferential surface and the rotor outer circumferential surface; and each of the outlet and the inlet is arranged to open normal to the rotor outer circumferential surface.

2. The dynamic pressure bearing pump according to claim 1, wherein the at least one second dynamic pressure groove includes a plurality of spiral grooves or a plurality of herringbone grooves.

3. The dynamic pressure bearing pump according to claim 1, wherein the at least one thrust dynamic pressure groove is a plurality of spiral grooves arranged to transfer the fluid in a direction of the rotor inner circumferential surface.

4. The dynamic pressure bearing pump according to claim 1, wherein
the at least one radial dynamic pressure groove is a plurality of herringbone grooves; and
a gap between the shaft outer circumferential surface and the rotor inner circumferential surface is arranged to have a width smaller than a width of a gap between the housing inner circumferential surface and the rotor outer circumferential surface.

5. The dynamic pressure bearing pump according to claim 1, wherein the magnet and the at least one second dynamic pressure groove radially overlap each other with respect to the central axis.

6. The dynamic pressure bearing pump according to claim 1, wherein the magnet and the at least one second dynamic pressure groove are arranged one above the other in the axial direction.

7. The dynamic pressure bearing pump according to claim 1, wherein
the at least one second dynamic pressure groove is a plurality of herringbone grooves arranged in a circumferential direction; and
each herringbone groove includes two spiral grooves arranged to obliquely extend in different directions, and a bend portion arranged between the two spiral grooves.

8. The dynamic pressure bearing pump according to claim 1, wherein the at least one second dynamic pressure groove includes only one array of herringbone grooves arranged in the circumferential direction; and each herringbone groove includes two spiral grooves arranged to obliquely extend in different directions, and a bend portion arranged between the two spiral grooves, and an axial position of the bend portion of each herringbone groove is arranged to overlap with an axial position of an opening of one of the outlet and the inlet.

9. The dynamic pressure bearing pump according to claim 1, wherein the at least one second dynamic pressure groove includes two arrays of herringbone grooves arranged in the circumferential direction; an axial position of the bend portion of each herringbone groove of one of the arrays is arranged to overlap with an axial position of an opening of the outlet; an axial position of the bend portion of each herringbone groove of another one of the arrays is arranged to overlap with an axial position of an opening of the inlet; and each herringbone groove includes two spiral grooves arranged to obliquely extend in different directions, and a bend portion arranged between the two spiral grooves, and the bend portion of each herringbone groove of the one array and the bend portion of each herringbone groove of the other array are oriented in opposite directions along a rotation direction of the rotor portion.

10. The dynamic pressure bearing pump according to claim 1, wherein
the at least one second dynamic pressure groove is a plurality of spiral grooves; and
the plurality of spiral grooves are arranged in such an orientation that rotation of the rotor portion transfers the fluid from the inlet to the outlet.

11. The dynamic pressure bearing pump according to claim 1, wherein each of the shaft outer circumferential surface and the rotor inner circumferential surface includes an inclined surface arranged to increase in diameter with decreasing distance from the rotor upper surface or the rotor lower surface; the at least one first dynamic pressure groove is defined in at least one of the inclined surface of the shaft outer circumferential surface and the inclined surface of the rotor inner circumferential surface.

12. The dynamic pressure bearing pump according to claim 11, wherein
the at least one second dynamic pressure groove is a plurality of spiral grooves; and
the plurality of spiral grooves are arranged in such an orientation that rotation of the rotor portion transfers the fluid from the inlet to the outlet.

13. The dynamic pressure bearing pump according to claim 12, wherein
the rotor portion includes a through hole arranged to pass therethrough in the axial direction;
the through hole is arranged to have an opening in each of the rotor upper surface and the rotor lower surface; and the openings of the through hole are arranged on a side of openings of the outlet and the inlet, respectively, closer to the central axis.

14. The dynamic pressure bearing pump according to claim 11, wherein
the at least one second dynamic pressure groove is a plurality of herringbone grooves arranged in a circumferential direction; and
each herringbone groove includes two spiral grooves arranged to obliquely extend in different directions, and a bend portion arranged between the two spiral grooves.

15. The dynamic pressure bearing pump according to claim 14, wherein each of the outlet and the inlet is arranged to open toward the rotor outer circumferential surface.

16. The dynamic pressure bearing pump according to claim 15, wherein
the at least one second dynamic pressure groove includes only one array of herringbone grooves arranged in the circumferential direction; and
an axial position of the bend portion of each herringbone groove is arranged to overlap with an axial position of an opening of one of the outlet and the inlet.

17. The dynamic pressure bearing pump according to claim 15, wherein
the at least one second dynamic pressure groove includes two arrays of herringbone grooves arranged in the circumferential direction;
an axial position of the bend portion of each herringbone groove of one of the arrays is arranged to overlap with an axial position of an opening of the outlet;
an axial position of the bend portion of each herringbone groove of another one of the arrays is arranged to overlap with an axial position of an opening of the inlet; and
the bend portion of each herringbone groove of the one array and the bend portion of each herringbone groove of the other array are oriented in opposite directions along a rotation direction of the rotor portion.

18. The dynamic pressure bearing pump according to claim 1, wherein an in-pipe pressure on the fluid flowing in the outlet is smaller than a maximum transfer pressure on the fluid generated by the at least one second dynamic pressure groove.

19. The dynamic pressure bearing pump according to claim 18, further comprising a pipe portion connected to the outlet and the inlet, wherein an inside of the dynamic pressure bearing pump and an inside of the pipe portion are arranged to together define a closed space in which the fluid circulates.

* * * * *